US007288898B2

(12) United States Patent
Ribarich et al.

(10) Patent No.: US 7,288,898 B2
(45) Date of Patent: Oct. 30, 2007

(54) AUTOMOTIVE HIGH INTENSITY DISCHARGE LAMP BALLAST CIRCUIT

(75) Inventors: Thomas J. Ribarich, Laguna Beach, CA (US); Peter Green, Redondo Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/369,053

(22) Filed: Mar. 6, 2006

(65) Prior Publication Data
US 2006/0197470 A1   Sep. 7, 2006

Related U.S. Application Data

(60) Provisional application No. 60/658,615, filed on Mar. 4, 2005.

(51) Int. Cl.
*H05B 37/02* (2006.01)
*H05B 41/16* (2006.01)

(52) U.S. Cl. ............... 315/225; 315/226; 315/246; 315/308

(58) Field of Classification Search .......... 315/209 R, 315/225, 226, 209 CD, 209 M, 291, 307, 315/308, 362, DIG. 5, DIG. 7, 246; 307/10.8
See application file for complete search history.

(56) References Cited

U.S. PATENT DOCUMENTS

| 5,384,518 A * | 1/1995 | Kido et al. ............ 315/225 |
| 5,463,287 A * | 10/1995 | Kurihara et al. .......... 315/307 |
| 5,569,984 A * | 10/1996 | Holtslag ............... 315/307 |
| 7,023,143 B2 * | 4/2006 | Harada et al. ......... 315/209 R |
| 2004/0217742 A1 * | 11/2004 | Ribarich et al. ......... 323/222 |
| 2005/0067981 A1 * | 3/2005 | Bocchiola ............ 315/291 |
| 2006/0087250 A1 * | 4/2006 | Fiorello .............. 315/212 |
| 2006/0087259 A1 * | 4/2006 | Fiorello .............. 315/291 |
| 2006/0113922 A1 * | 6/2006 | Ribarich et al. ....... 315/209 R |
| 2006/0279230 A1 * | 12/2006 | Lee et al. ............ 315/247 |

* cited by examiner

*Primary Examiner*—Thuy Vinh Tran
(74) *Attorney, Agent, or Firm*—Ostrolenk, Faber, Gerb & Soffen, LLP

(57) ABSTRACT

An electronic ballast for driving a high intensity discharge (HID) lamp is provided. The electronic ballast includes a voltage boost stage for receiving a DC input voltage and outputting a boosted DC output voltage with a controlled current. It further includes a switching stage for converting the boosted DC output voltage to a switched AC voltage capable of driving the HID lamp. An integrated circuit (IC) is coupled to the voltage boost stage and the switching stage for controlling both. The IC includes a lamp power control circuit comprising a sensing circuit for sensing an output current from the switching stage and the boosted DC output voltage, a current control loop which controls the lamp power if the lamp current is at a maximum level and a power control loop which controls the lamp power if the lamp current is below a maximum level. The IC also includes a controller unit interface and provides an ignition mode and a regular operation mode.

25 Claims, 20 Drawing Sheets

| FIG.4A | FIG.4B | FIG.4C |
| --- | --- | --- |
| FIG.4D | FIG.4E | FIG.4F |

| FIG.5A | FIG.5B | FIG.5C |
|---|---|---|
| FIG.5D | FIG.5E | FIG.5F |

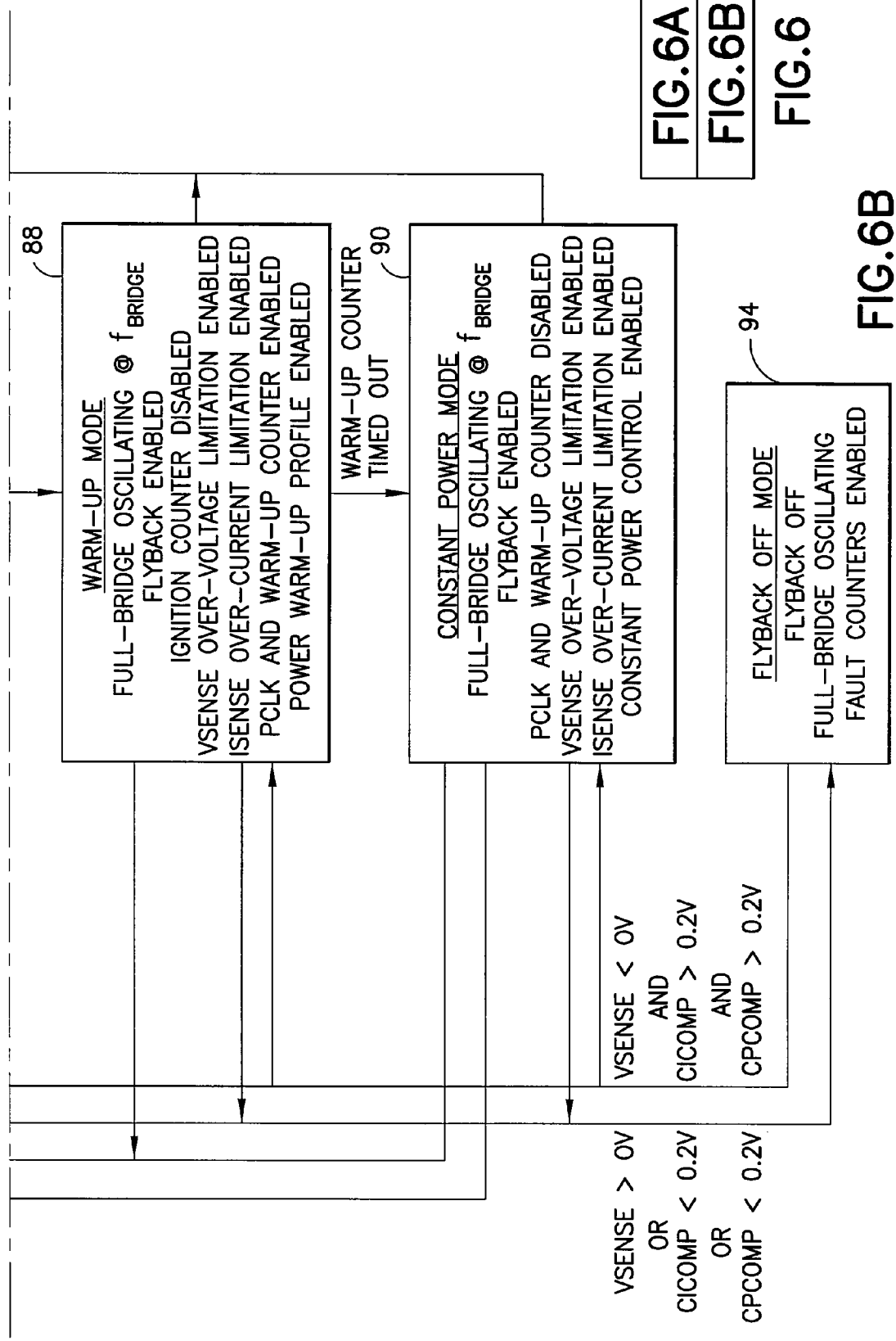

AUTOMOTIVE HIGH INTENSITY DISCHARGE LAMP BALLAST CIRCUIT

CROSS-REFERENCE TO RELATED APPLICATION

The present application claims the priority and benefit of U.S. Provisional Application Ser. No. 60/658,615 filed Mar. 4, 2005 entitled AUTOMOTIVE HID CONTROL IC, the entire contents of which are hereby incorporated by reference.

BACKGROUND OF THE INVENTION

The present invention relates to powering high intensity discharge (HID) lamps, and more particularly, to a novel circuit for continually monitoring and adjusting lamp current and voltage.

First automobiles of the late 1800s were not equipped with headlights. Automobile headlights were added in 1885 to allow travel in the evening hours. The first electric headlamps appeared in 1905 and eventually became the norm. Sealed beam headlights were used into the 1970s and replaced by halogen headlamps in the 1980s and '90s. At present, the halogen headlights are being replaced by HID (High Intensity Discharge) lamps.

The HID lamp provides a high-intensity light produced from an electric arc inside a capsule filled with xenon gas. The arc produces significantly more light than a glowing filament found in the halogen lamps. The HID lamps draw less power from a vehicle's electrical system, they are more durable, have higher intensity, longer life, and better directivity than their halogen counterparts.

The HID lamps produce light by striking an electrical arc across tungsten electrodes housed inside a specially designed inner glass tube. This tube is filled with both gas and metals. The gas aids in the starting of the lamps and the metals produce the light once they are heated to a point of evaporation. The HID lamps produce a large quantity of light in a small package.

An HID lamp typically requires a higher voltage, e.g., 400V, for ignition, which is followed by an operating region in which voltage is lower, e.g., 100V, with current in the range of a few amperes. In this operating region, it is desirable to maintain a constant power output. It is also desirable to achieve a constant luminescence, even during the initial startup period, particularly for automotive applications.

It is important for longevity of an HID lamp to regulate the power supply to the lamp during normal running conditions. Accordingly, it is desirable to provide constant power to the lamp during normal operation to maintain an even light output and extend the longevity of the HID lamp.

A typical prior art solution for a HID ballast circuit (FIG. 1) includes a boost stage 10 and a full-bridge inverter stage 12. The boost stage 10 boosts the DC battery voltage and regulates the DC bus output voltage to a typical value of 400VDC. The full-bridge stage 12 drives the lamp 13 at a low frequency (200 Hz typical) and provides the AC voltage waveform across the lamp 13. The boost stage 10 is typically controlled with a control IC 14, of which several are marketed by various IC manufacturers. The full-bridge stage 12 may be controlled using two International Rectifier IR2153 self-oscillating gate driver ICs 18. Discrete control circuitry 19 is typically used to control the full-bridge stage 12 and performs the following functions:

1) Lamp ignition (ON/OFF control of the ignitor circuit 20)
2) Senses lamp voltage and current
3) Detects various lamp fault conditions
4) Provides ignition timing
5) Counts the number of fault events
6) Resets the ballast or turns the ballast off when faults occur or when the fault counter has timed out.

This solution typically requires a large number of control ICs resulting in a high component count, large area of Printed Circuit Board (PCB) space, high manufacturing costs, and high overall ballast circuit cost. A more elegant solution is desired for integrating as many functions as possible into a single IC to reduce component count, reduce PCB board space, reduce manufacturing costs, reduce overall ballast cost, and increase reliability. Moreover, there is a need for a constant power control circuit that will deliver and maintain a constant power to the automotive HID lamp and further provide a constant lamp brightness even during the critical warm-up period. Further an HID ballast which provide for a hot restrike of the lamp in the event the lamp goes out is also necessary, particularly in an automotive application.

SUMMARY OF THE INVENTION

An electronic ballast for driving a high intensity discharge (HID) lamp is provided. The ballast and its components are controlled by an integrated circuit (IC) is coupled to the ballast. The electronic ballast includes:

a voltage boost stage for receiving a DC input voltage and outputting a boosted DC output voltage with a controlled current;

a switching stage for converting the boosted DC output voltage to a switched AC voltage capable of driving the HID lamp;

a cascade circuit and an ignition unit, where during the ignition mode the cascade circuit providing a high voltage to the ignition unit through a plurality of high value resistors, the high voltage developing an arc in the lamp and causing a high current to flow in the lamp to ignite the lamp, the cascade circuit is not being disabled when the lamp is lit; and a hot restrike circuit providing a two stage discharge from at least two capacitors, wherein during the ignition mode a first capacitor charges to a first voltage and a second capacitor charges to a second voltage and thereafter the first capacitor discharges into the lamp until the DC bus voltage drops below a threshold level, at which time the second capacitor discharges into the lamp.

The IC coupled to the ballast includes:

a circuit for setting ON time and OFF time of a PWM signal, the PWM signal increasing or decreasing the boosted DC output voltage by controlling a controlled switch in accordance with the set ON and OFF times;

a driver for providing control signals to the switching stage, the switching stage being provided with the boosted DC output voltage and providing AC power to the HID lamp;

a circuit for setting a duty cycle of the PWM signal to thereby control the ON-time of the controlled switch, this circuit being responsive to the output current and the boosted DC output voltage for controlling the power provided to the lamp;

a lamp power control circuit comprising a sensing circuit for sensing an output current from the switching stage and the boosted DC output voltage, a current control loop which controls the lamp power if the lamp current is at a maximum level and a power control loop which controls the lamp power if the lamp current is below a maximum level;

a warm up profile circuit for causing an overdrive of the lamp for providing a high light output immediately after ignition and to bring the lamp from its cold state to it nominal operating temperature; and a controller unit interface for connecting to a controller unit, the controller unit directly controlling the IC controller and through it the voltage boost stage and the switching stage, the controller unit allowing a user to reprogram the IC controller for controlling lamps having different power requirements, wherein the IC controller includes a default lamp power requirement setting.

The ballast and the IC are provided for detecting the current and DC bus voltage of a ballast circuit that provides constant power during ignition and operation phases of the HID lamp. The inventive system and method maintain constant power during normal operation by adjusting the input DC bus voltage provided to the ballast circuit full bridge, the full-bridge receiving input control signals from a driver stage.

In accordance with the present invention, an oscillating frequency of the full-bridge is set by the driver stage such that sink and a source currents ramp up and down between internal thresholds. Thus, the oscillating frequency continuously ramps the source current of the full-bridge up and down with a 50% duty cycle and fixed internal dead-times. When the oscillating frequency ramps up the source current, the full-bridge gate driver switches a first low side switch and a second high side switch of the full-bridge to ON and a second low side switch and a first high side switch of the full-bridge to OFF and when the oscillating frequency ramps down the source current, the full-bridge gate driver switches the second low side switch and the first high side switch of the full-bridge to ON and the first low side switch and the second high side switch of the full-bridge to OFF.

The invention further senses an output current of the full-bridge and the DC bus voltage provided to the full-bridge. The sensed current is compared with a current reference threshold and the sensed voltage is compared with a voltage reference threshold. If the voltage is higher or has increased with respect to the voltage reference threshold and/or the current is higher or has increased with respect to the current reference threshold, a PWM drive signal provided to a boost/flyback stage providing the input DC bus voltage is set to LOW. If the voltage is lower or has decreased with respect to the voltage reference threshold and/or the current is lower or has decreased with respect to the current reference threshold, the PWM drive signal to the boost/flyback stage is set to HIGH.

Thus if the PWM drive signal to the boost/flyback stage is set HIGH, it turns on the boost/flyback stage switch to increase the DC bus voltage. A maximum OFF-time of the PWM ON-time/OFF-time cycle is set by the charging time of an external capacitor. The input voltage to the full-bridge provided by the boost/flyback stage is thus increased or decreased in response to the PWM signal.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

Figure 1:
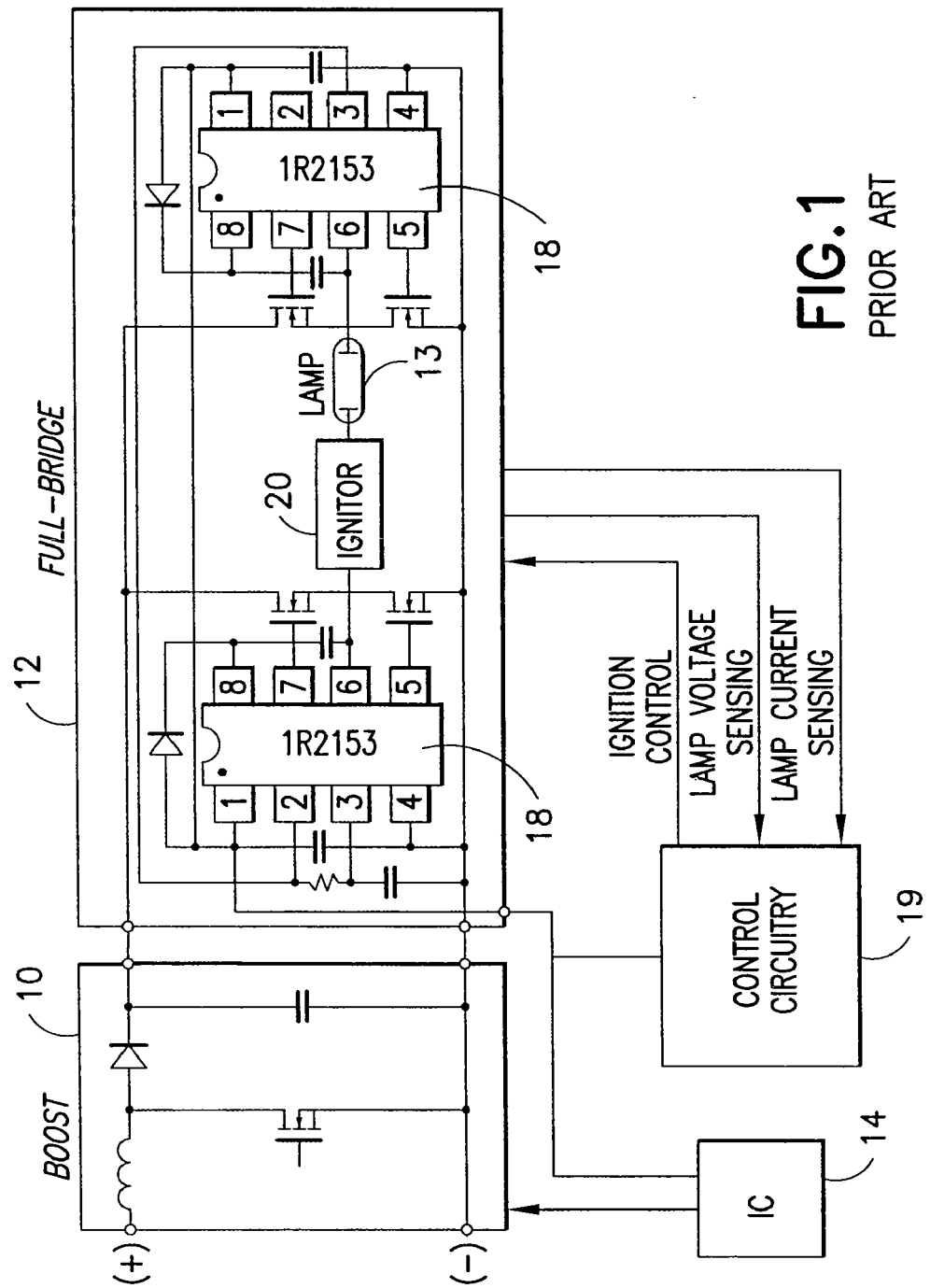
FIG. 1 is a schematic block diagram showing a typical known HID ballast circuit.
Figure 2:
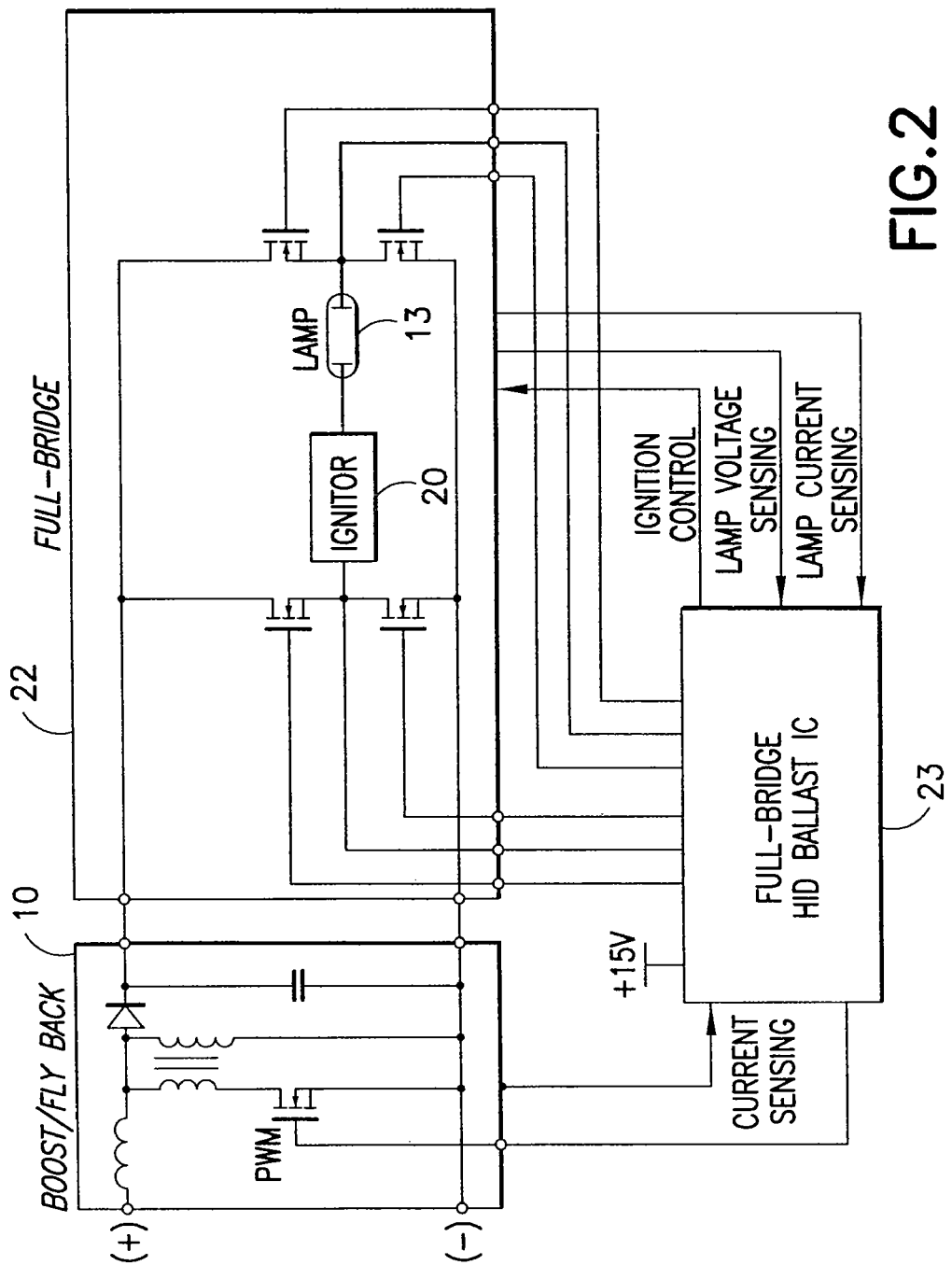
FIG. 2 is a simplified schematic block diagram showing an HID circuit including a ballast control IC according to an embodiment of the invention.
Figure 4A:
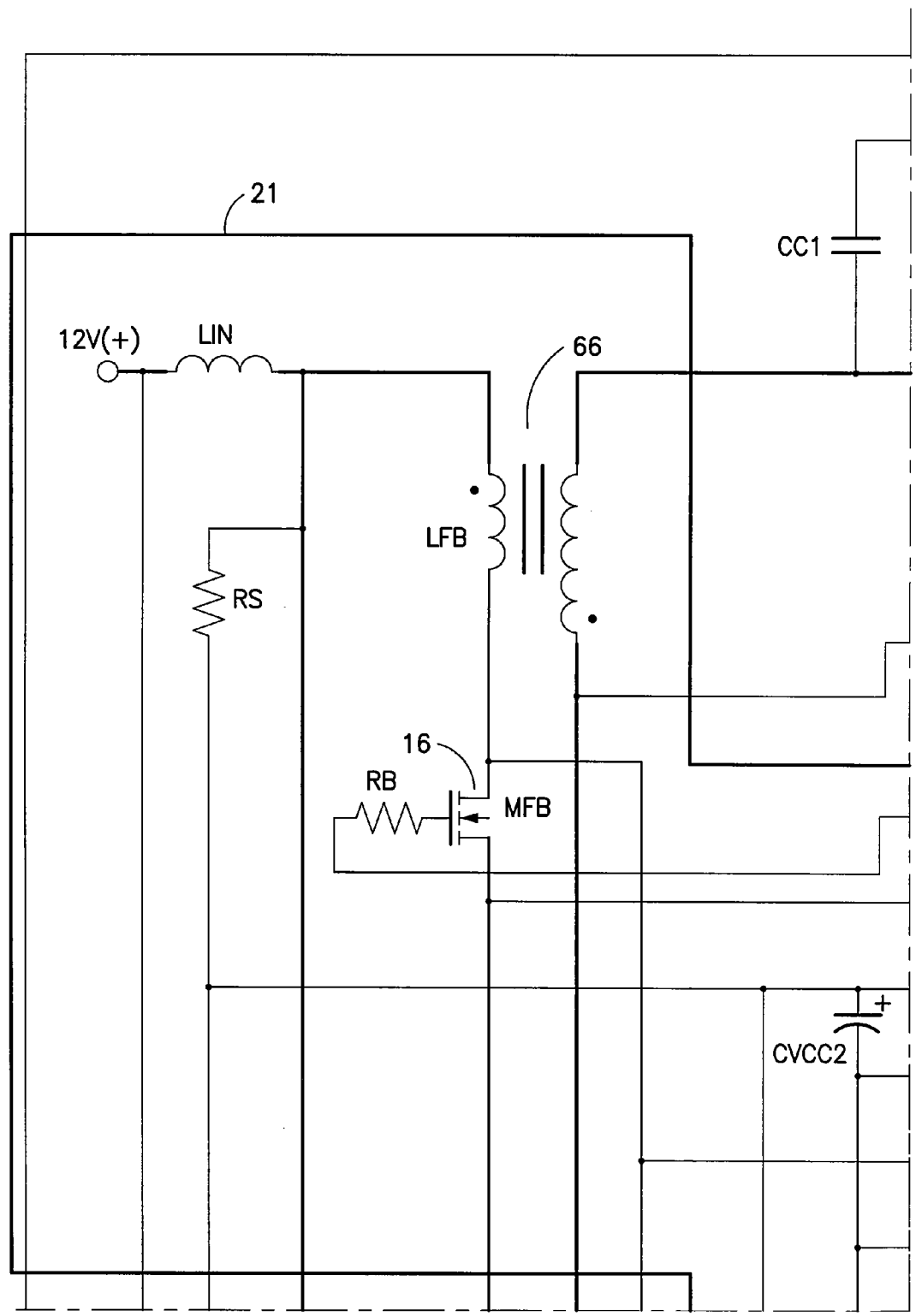
FIG. 4 including 4A-F is a schematic application diagram for the ballast control IC of the invention showing a first embodiment circuit.
Figure 4B:
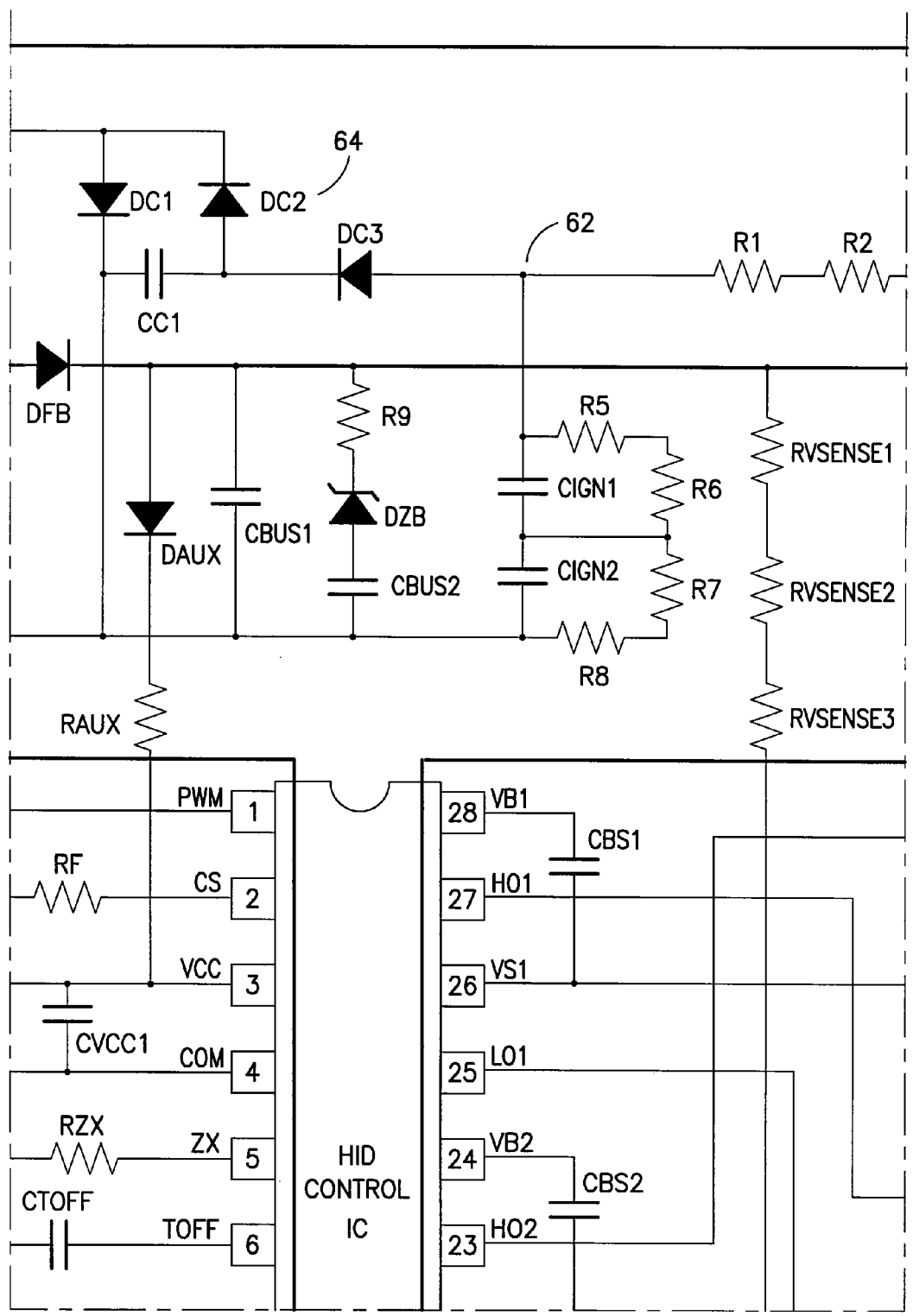
Figure 4C:
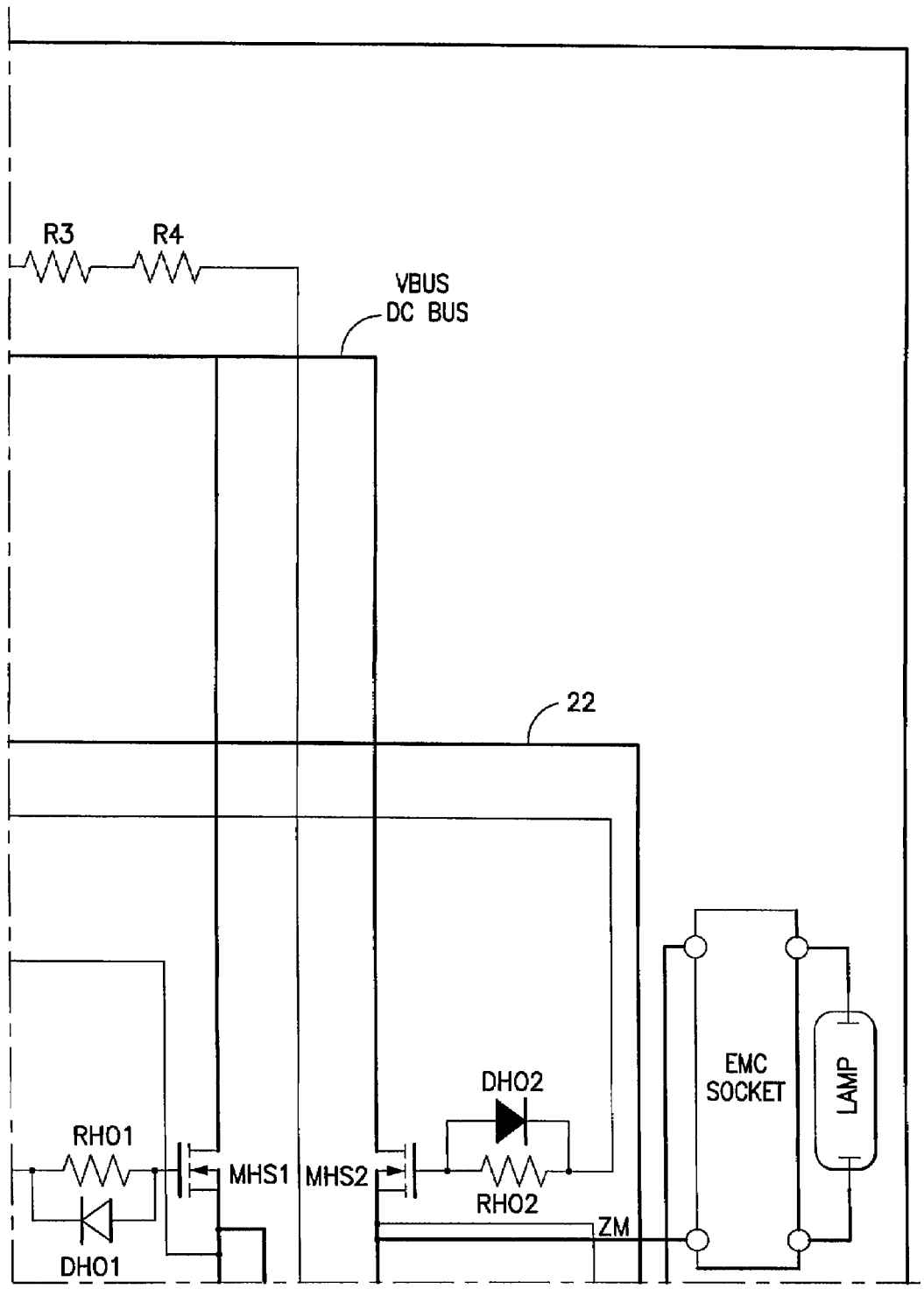
Figure 4D:
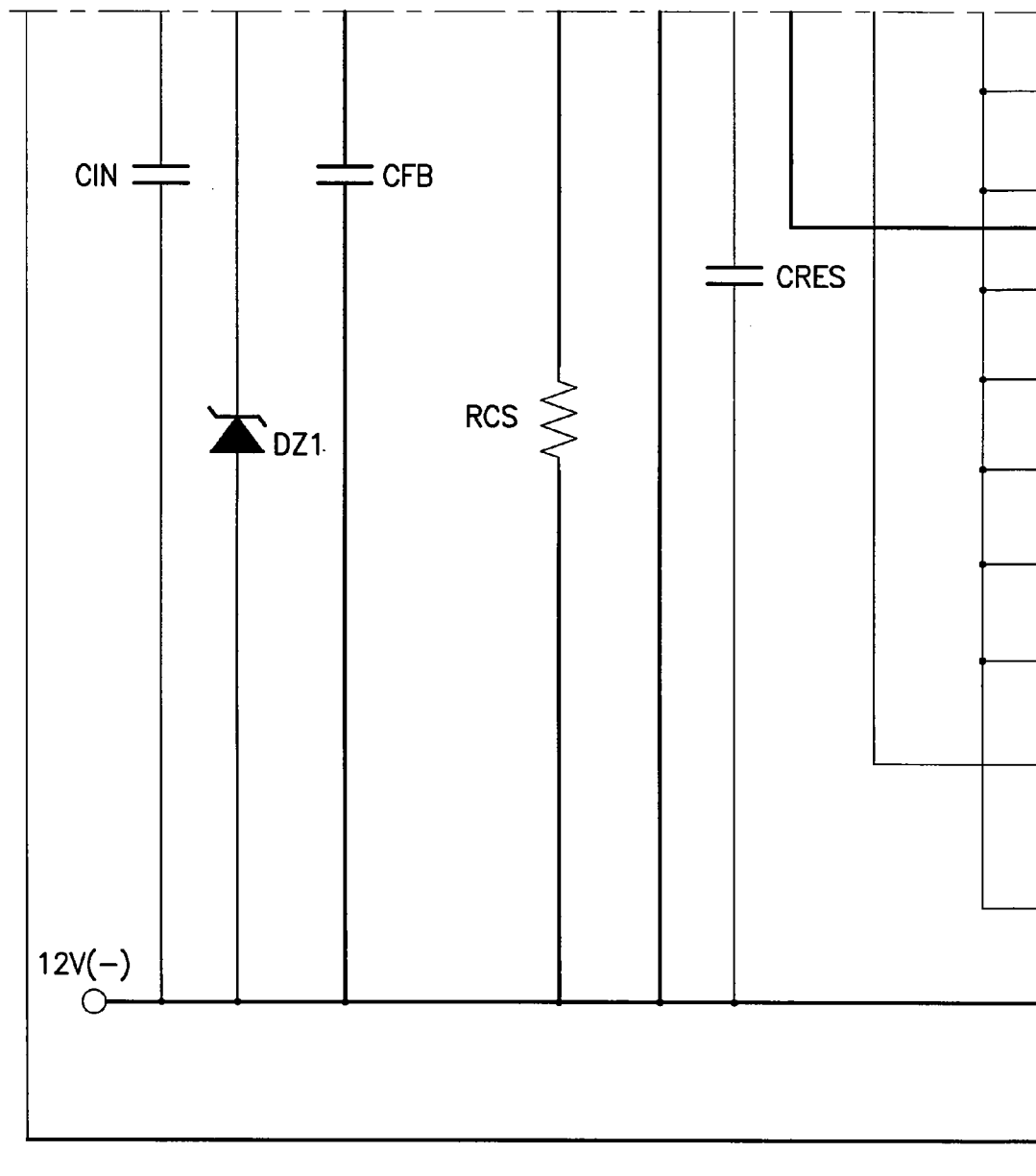
Figure 4E:
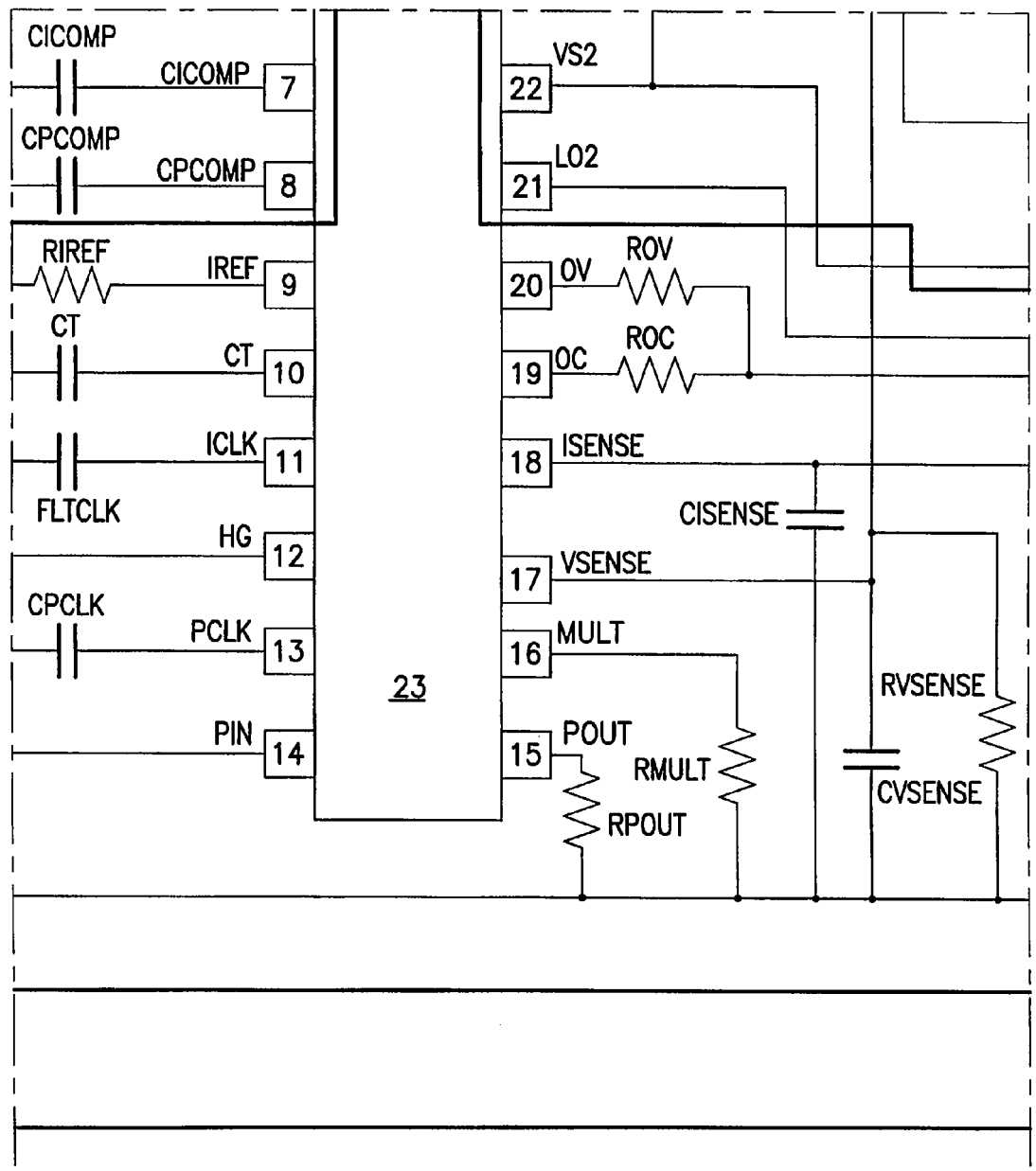
Figures 4, 4F:
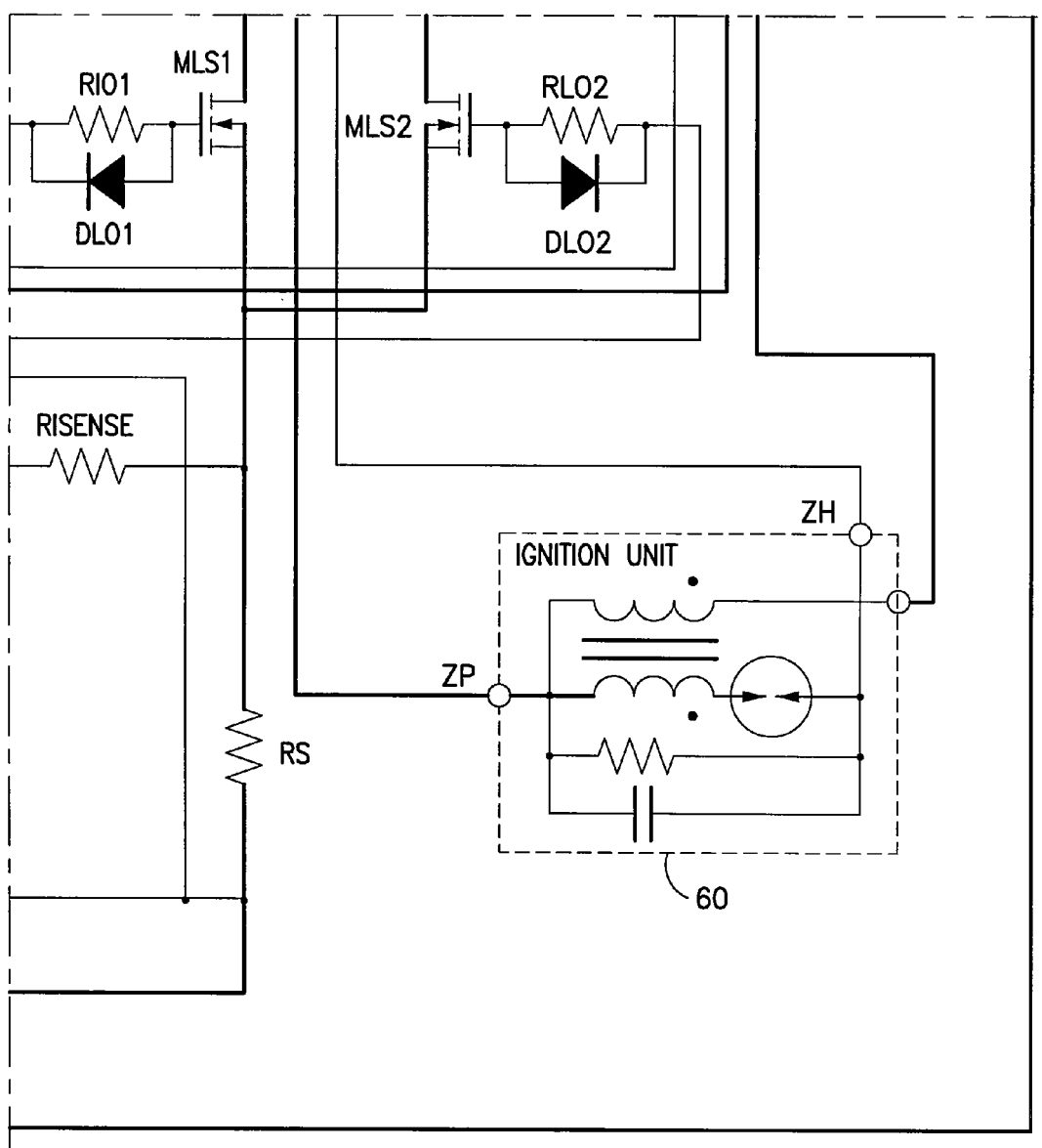
Figure 5A:
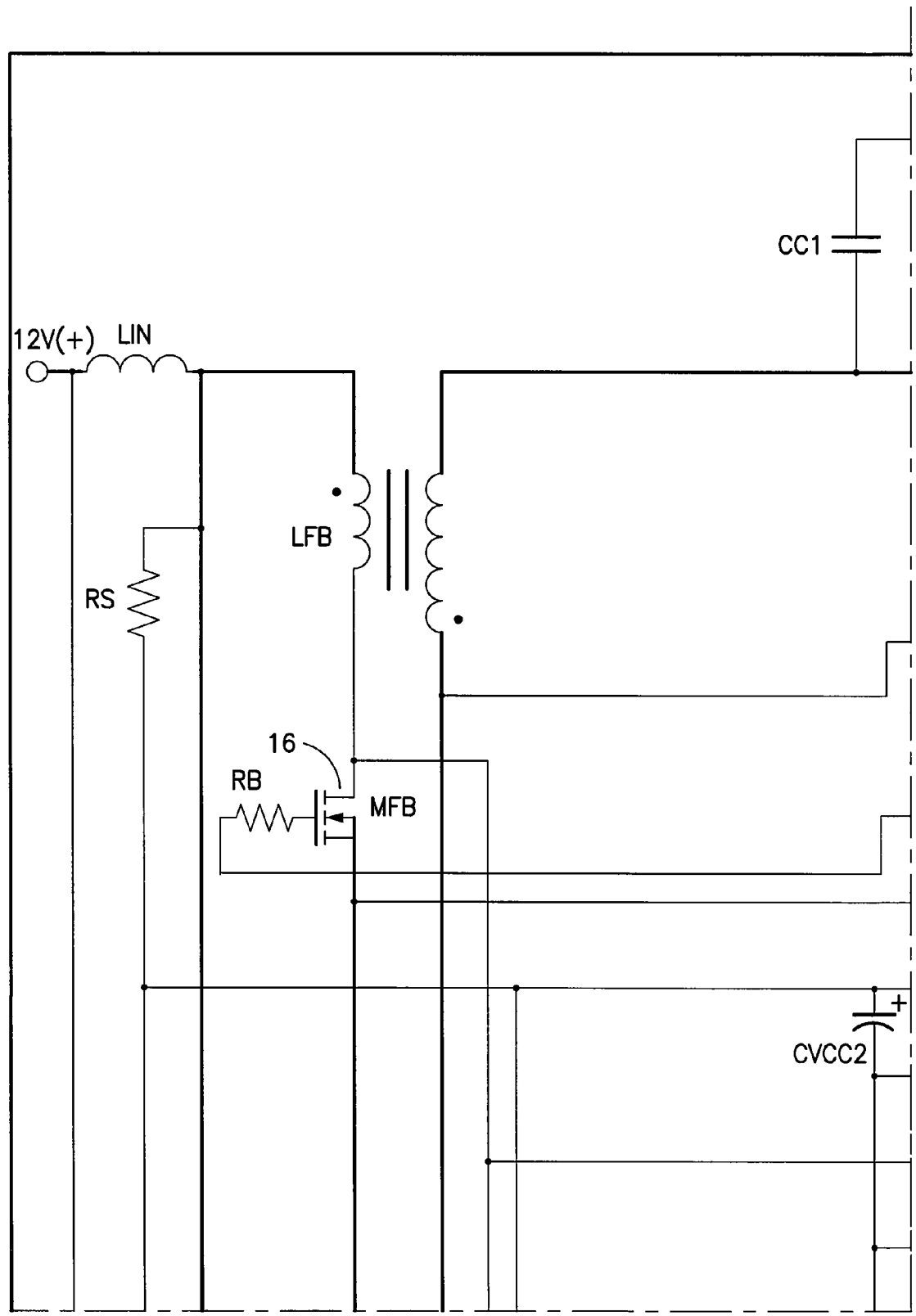
FIG. 5 including 5A-F is a schematic application diagram for the ballast control IC of the invention showing a second circuit embodiment.
Figure 5B:
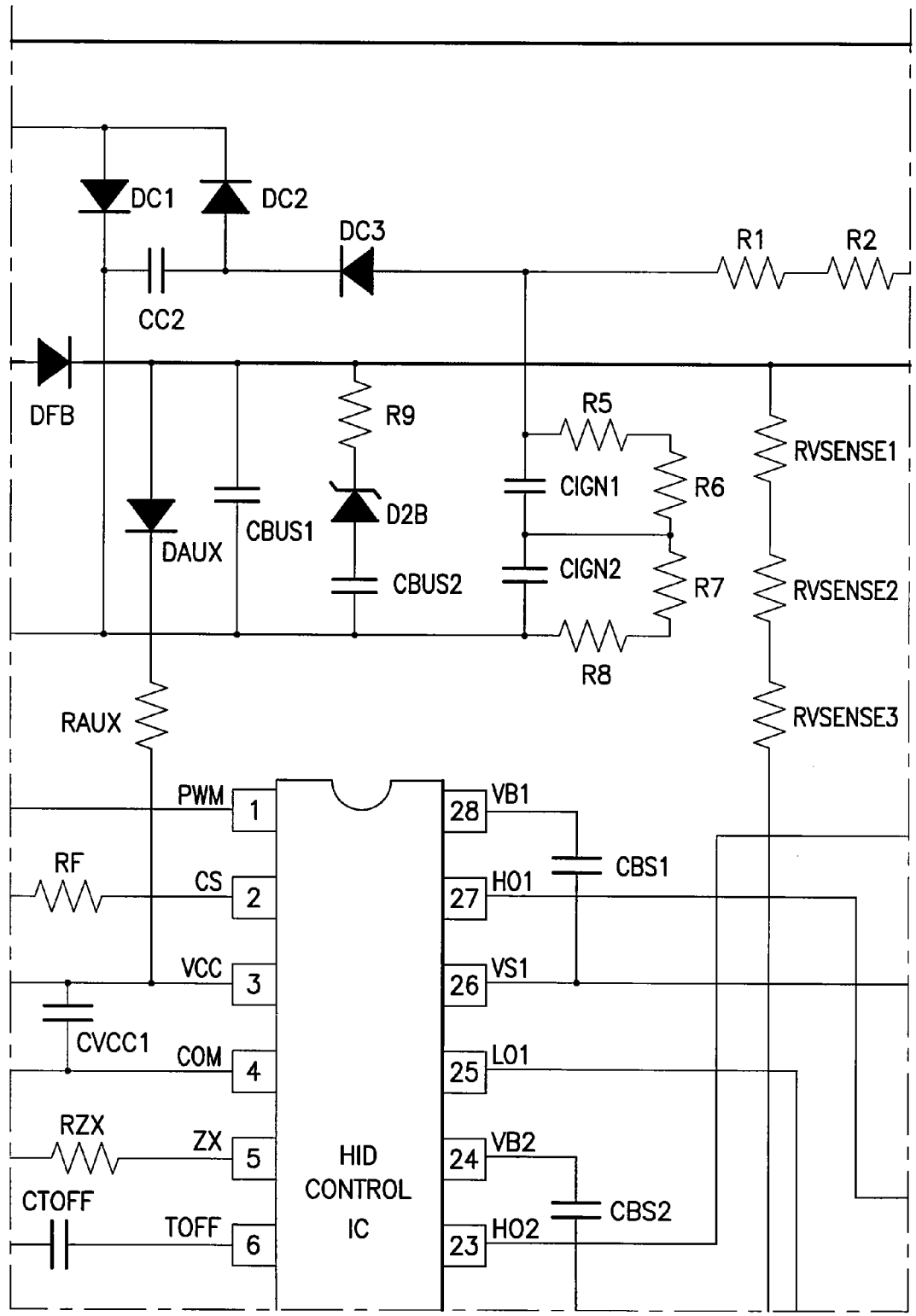
Figure 5C:
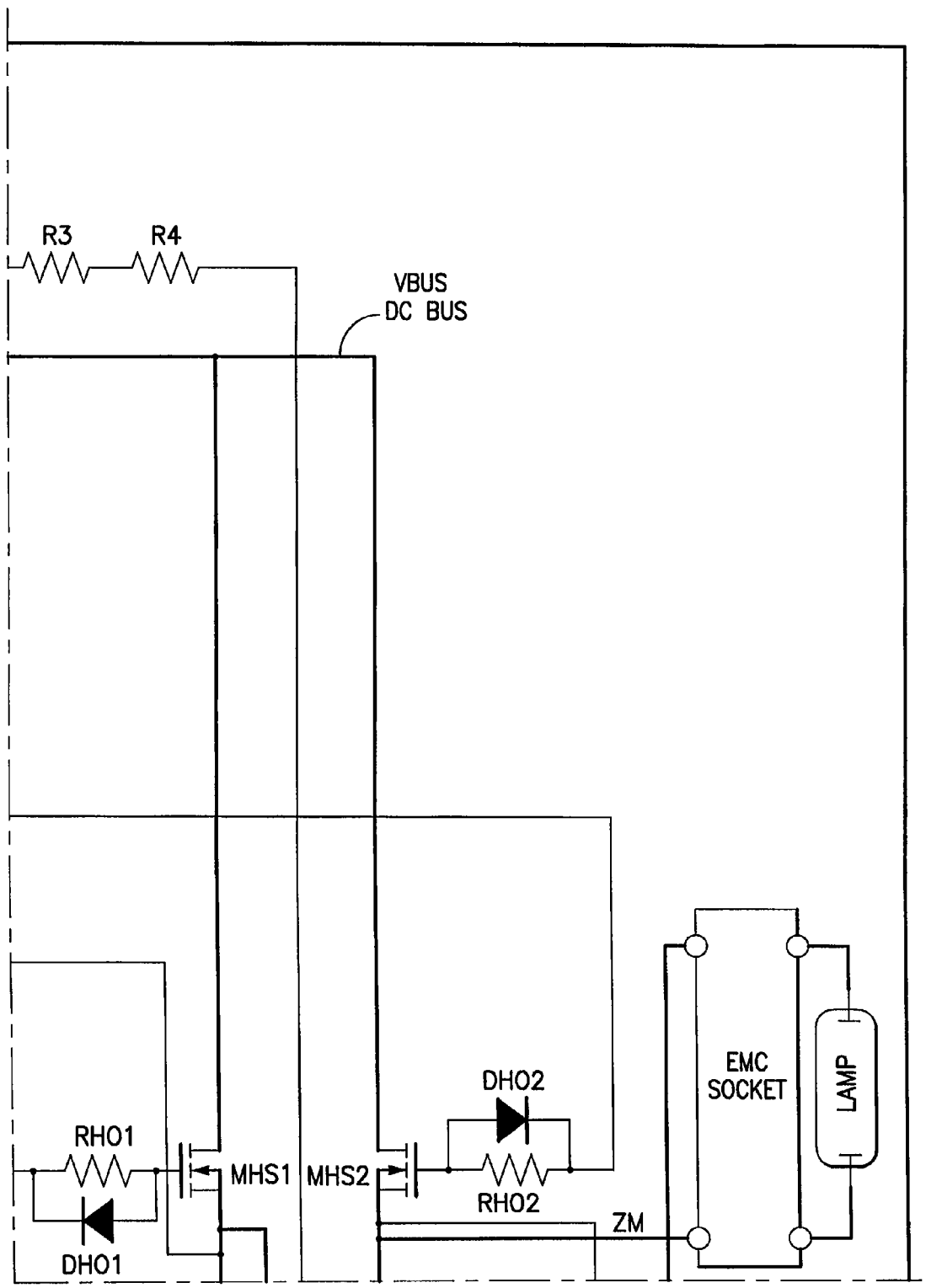
Figure 5D:
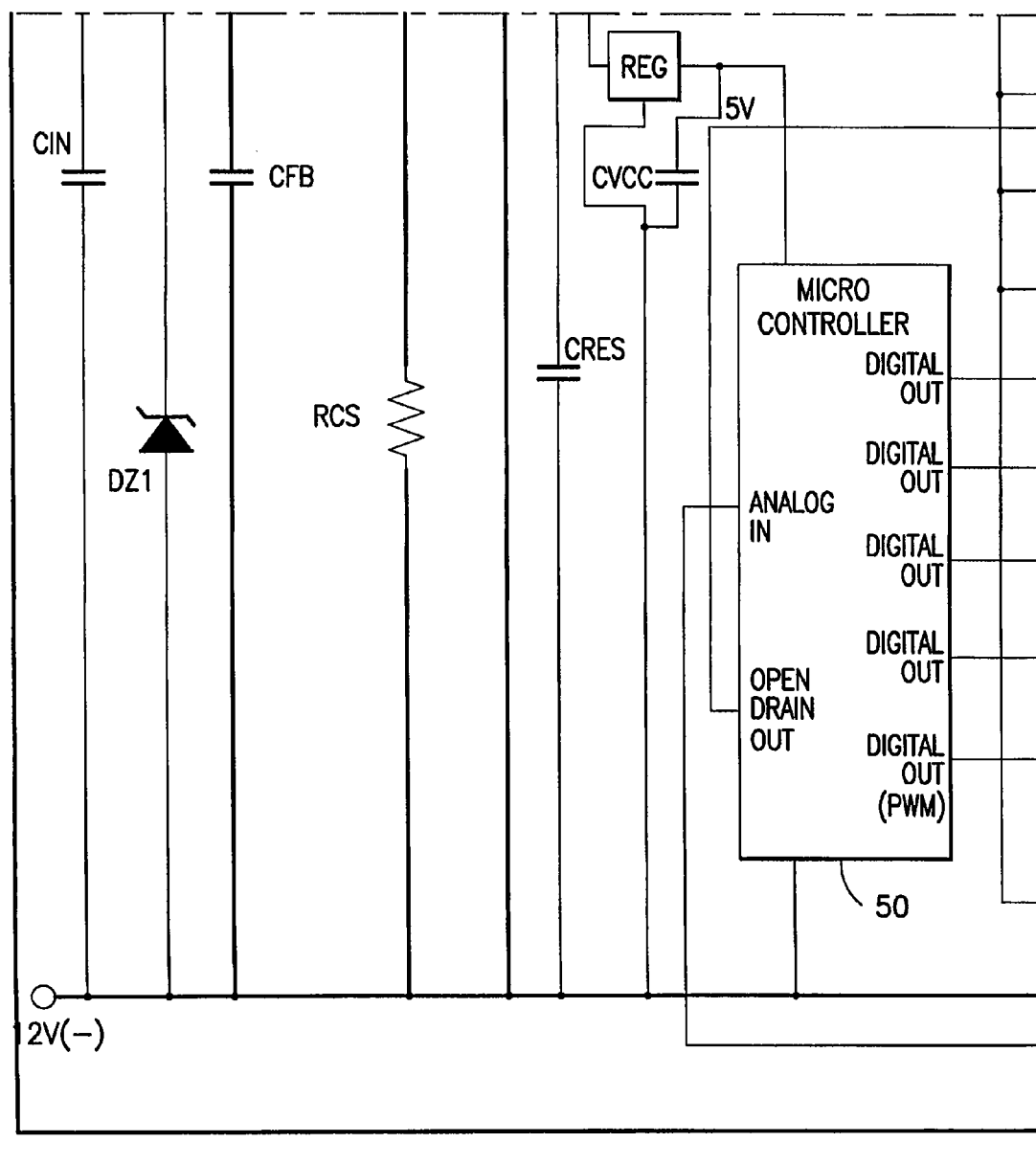
Figure 5E:
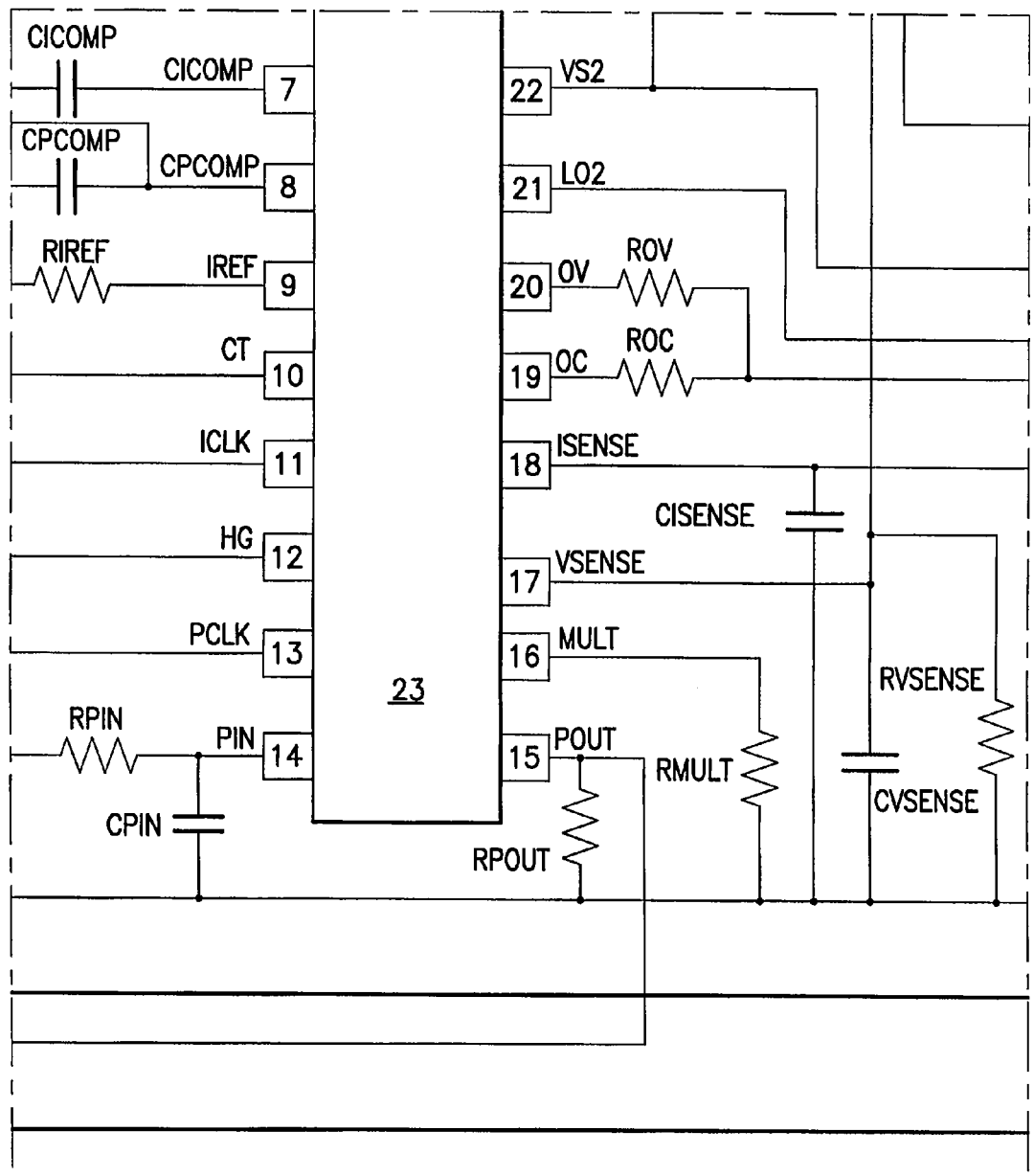
Figures 5, 5F:
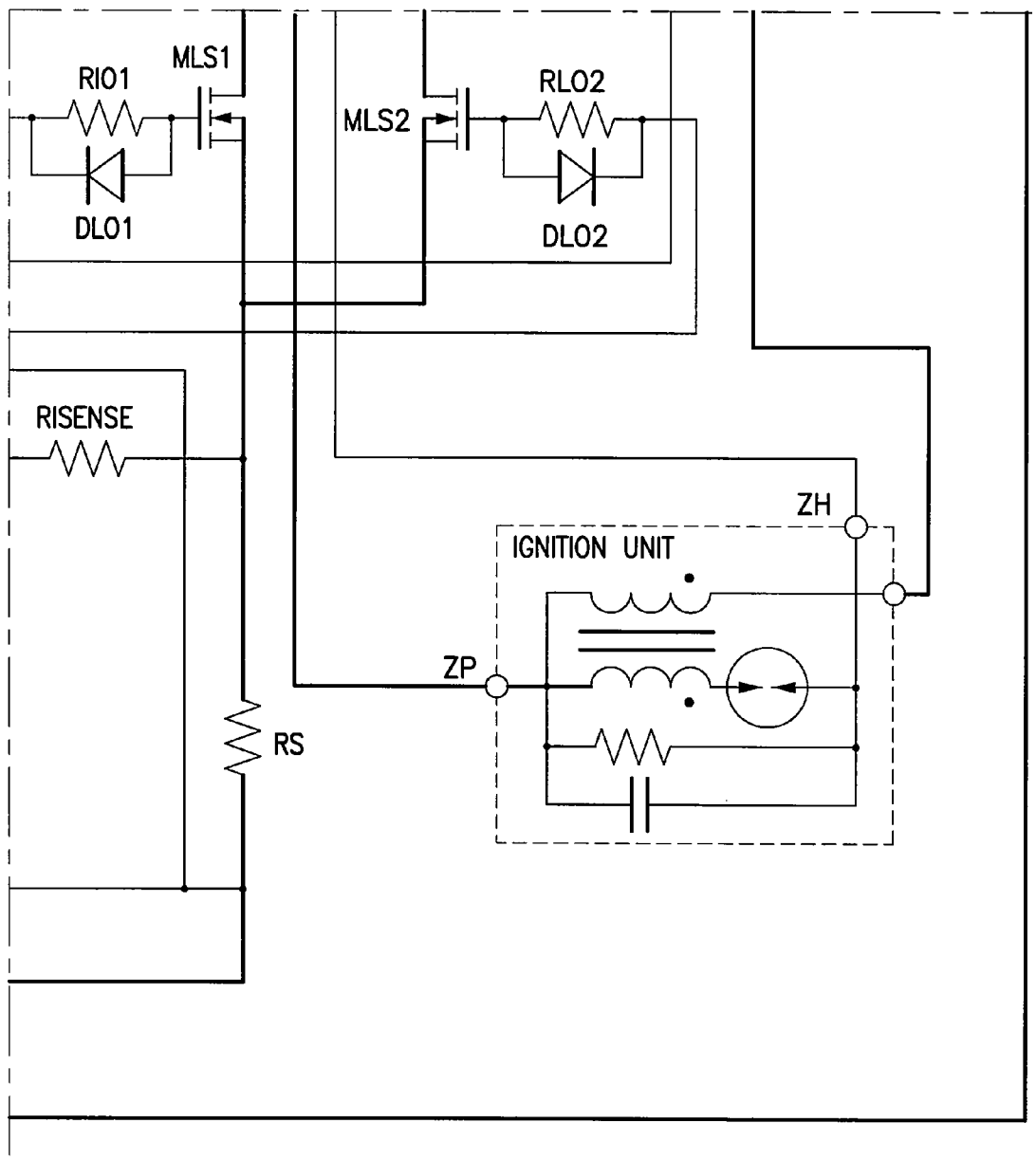

The HID control IC 23 shown in FIG. 2 provides necessary circuitry for controlling the DC bus voltage provided to the full bridge inverter stage by controlling an input boost/flyback converter at the input of the ballast, for ignition and warm-up control, for normal or running operation full-bridge control of the ballast, and fault protection. FIG. 4 illustrates how the IC 23 controls a quasi-resonant flyback converter at the input stage of the ballast, drives the full-bridge 22 for the HID lamp, controls lamp power during warm-up and running modes, sets the ignition and warm-up profile counter times and provides fault protection against open-load and short-circuit conditions. In another embodiment, an interface to an external MCU for programming is also provided (FIG. 5).

Flyback Converter Control

In a preferred embodiment of the invention shown in FIG. 4, the ballast includes a quasi-resonant flyback converter circuit 21. Although a flyback converter circuit is shown, a boost converter could also be used. The flyback converter provides advantages in that a lower voltage switch 16 can be used. The circuit 21 utilizes the lower of the voltages of a maximum current control at ICOMP pin 7 and a maximum power control at PCOMP pin 8 to determine a gate drive ON-time of a flyback MOSFET switch 16. The drain voltage of the flyback MOSFET 16 is monitored via a limiting resistor RZX connected to ZX pin 5 to determine when it switches OFF. When the MOSFET 16 switches OFF, a capacitor CRES, also connected to the flyback MOSFET's 16 drain, will ring the drain voltage at a defined frequency, rising and then falling back to zero. When the drain voltage is determined to reach zero, the IC 23 causes the MOSFET 16 to switch on again by setting its ON-time. In this way, zero-voltage switching of the MOSFET 16 can be accomplished, allowing it to run at a lower temperature.

A default maximum flyback OFF-time is set by TOFF pin 6. If before the end of the time determined by the external CTOFF capacitor connected to TOFF pin 6, no signal to switch the flyback MOSFET 16 ON is detected, the MOSFET gate will be switched ON again.

Figure 3A:
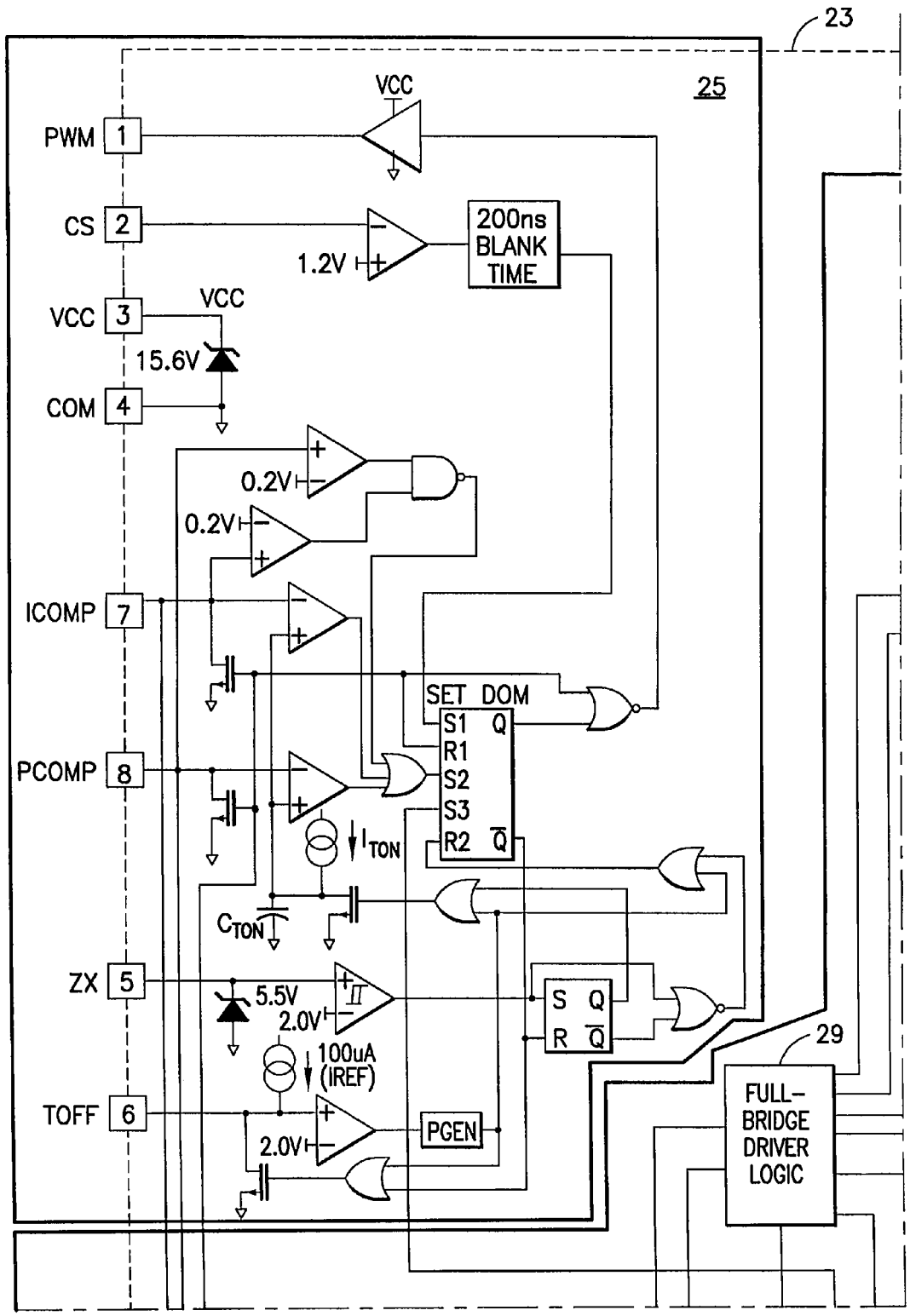
FIG. 3 including 3A-D is a detailed schematic block diagram of the ballast control IC.
Figure 3B:
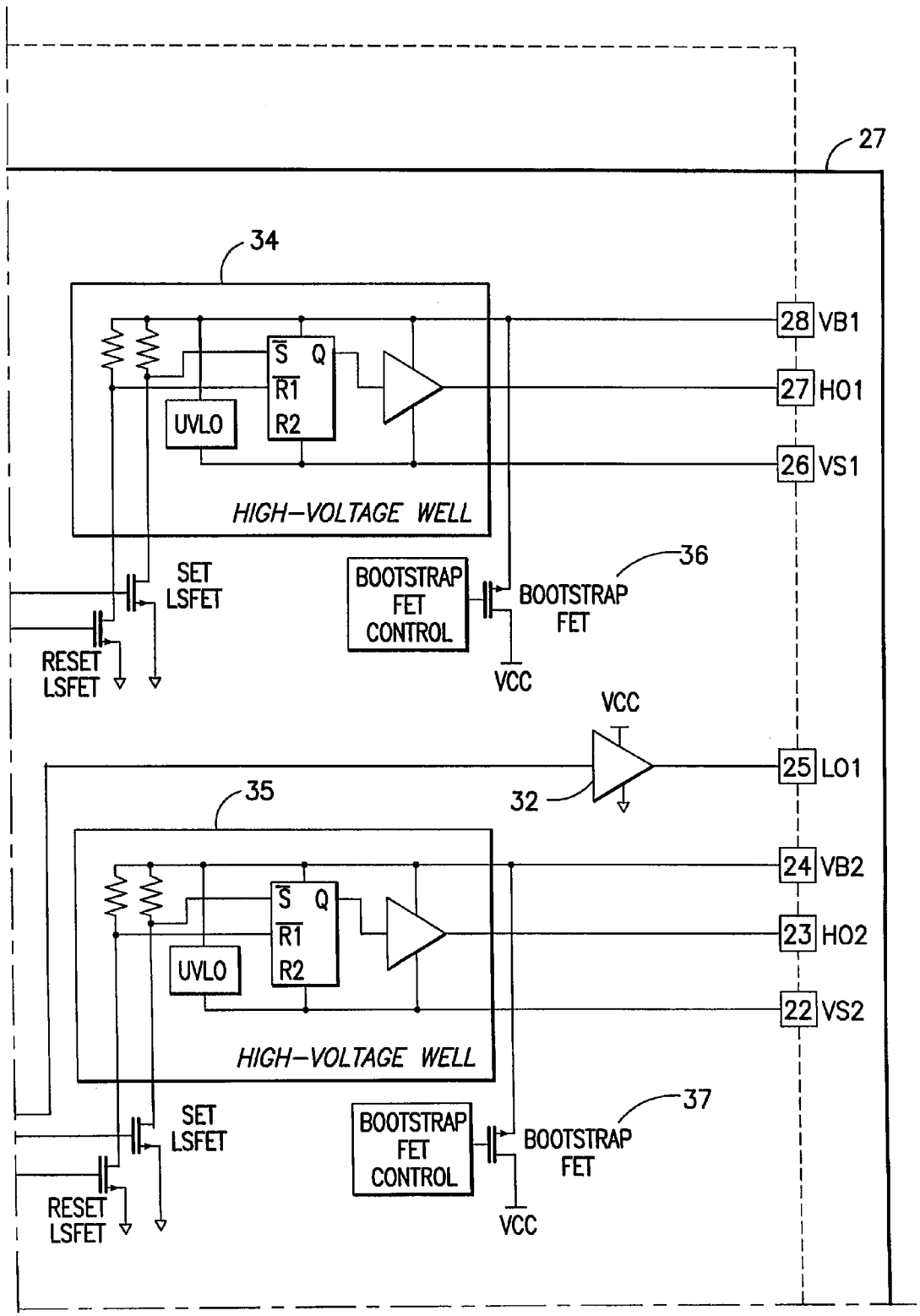
Figure 3C:
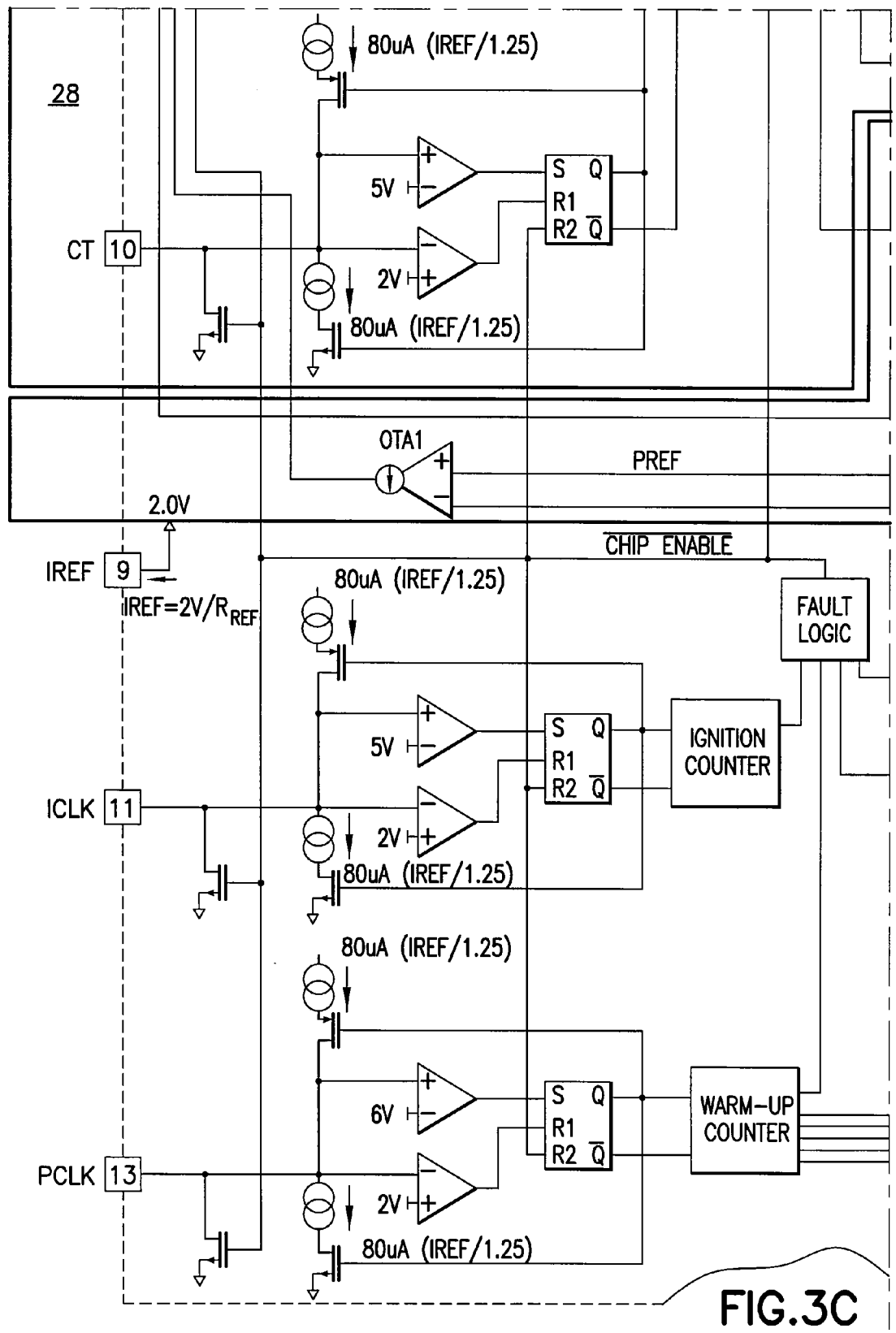
Figures 3, 3D:
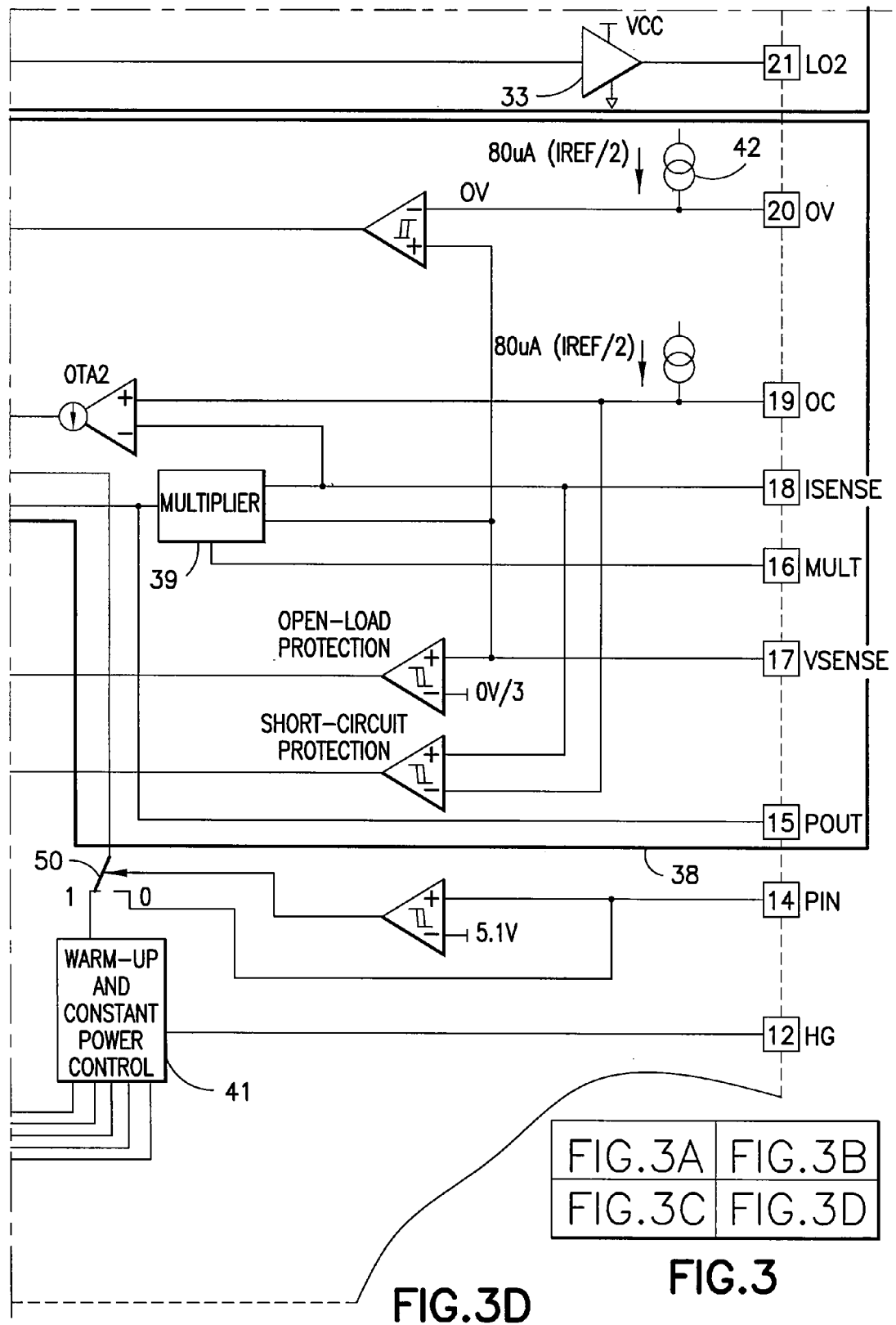

Within the IC 23, the flyback converter 21 is controlled using the PWM, CS, ZX, TOFF, ICOMP and PCOMP pins, and their associated circuitry. Referring to FIGS. 3 and 4, PWM pin 1 serves as a flyback PWM sink/source MOSFET gate driver output (ON/OFF gate signal) for the external flyback MOSFET 16. The ON-time of the PWM signal on PWM pin 1 is determined by a voltage on a lamp current limitation/PWM ON-time setting ICOMP pin 7 or a lamp constant power/PWM ON-time setting PCOMP pin 8, determined by whichever pin is at a lower voltage. These two compensation pins control the flyback ON-time depending on whether the lamp is in a constant power or current limitation mode.

Specifically, ICOMP pin 7 determines the ON-time of the PWM gate driver output. An external resistor RS is placed between the sources of the low-side full-bridge MOSFETs MLS1, MLS2 and ground for measuring the lamp current. This lamp current is sensed at a lamp current sensing ISENSE pin 18. There are two control loops, one for lamp current and one for lamp power. The lamp current control loop is centered about an amplifier OTA2. The power control loop is centered about a multiplier 39 and amplifier OTA1. Together, their circuits form a constant power control loop and a current limitation control loop 38. An external capacitor CICOMP connected to pin 7 sets the loop speed of the current limitation control loop.

In response to sensing the full-bridge lamp current at ISENSE pin 18, the current limitation control loop regulates the current based on a voltage programmed at a lamp current limitation threshold set at OC pin 19 using an internal operation transconductance amplifier OTA2. The voltage at OC pin 19 is a voltage threshold set by an internal current source (set or programmed by a resistor RIREFF at IC reference current setting IREF pin 9) together with an external resistor ROC. This voltage threshold is the upper current limitation threshold for the lamp current detected at ISENSE pin 18.

If the voltage at ISENSE pin 18 is greater than the voltage at OC pin 19, the OTA2 will sink current from ICOMP pin 7 to discharge the external capacitor CICOMP at this pin, thereby decreasing the voltage. This will decrease the PWM ON-time and decrease the flyback current to reduce the full-bridge 22 lamp current.

If the voltage at ISENSE pin 18 is less than the voltage at OC pin 19, then the opposite will occur and the voltage at ICOMP pin 7 will increase to increase the PWM ON-time and increase the full-bridge 22 lamp current. Thus, by sensing the lamp current, at ISENSE, a current control loop controlling the flyback switch 16 is established.

A power control loop is also provided. This is determined by the voltage at PCOMP pin 8. This voltage also steers the PWM ON-time for the constant power control loop. The voltage at PCOMP pin also determines the ON-time of the PWM gate driver output. The constant power control loop senses the lamp current at ISENSE pin 18 and the lamp voltage (DC bus voltage) at VSENSE pin 17 sensed by an external resistor RVSENSE of a resister divider connected to pin 17. This lamp voltage measurement is used for the constant power control loop and a maximum boost output voltage programmed by OV pin 20. The functionality of OV pin 20 is discussed below.

The constant power control loop multiplies the sensed control and voltage together with the internal multiplier 39. The multiplier gain is set by MULT pin 16 determined by an external resistor RMULT. The output of the multiplier is then regulated to a fixed internal 2V threshold by adjusting PCOMP pin 8 voltage using the internal operational transconductance amplifier OTA1. An external capacitor CPCOMP connected to pin 8 sets the loop speed of the constant power control loop.

If the multiplier output voltage is greater than the internal power reference voltage, the OTA1 will sink current from PCOMP pin 8 to discharge the external capacitor CPCOMP at this pin and therefore decrease the voltage. This will decrease the PWM ON-time and decrease the flyback current to reduce the full-bridge lamp current and therefore decrease lamp power.

If the multiplier output voltage is less than the internal 2V reference voltage, then the opposite will occur and the PCOMP pin voltage will increase to increase the flyback ON-time to increase the full-bridge lamp current and increase lamp power. However, the ICOMP pin 7 is also steering the ON-time for the current limitation control loop whichever voltage of the COMP pins (ICOMP or PCOMP) is lower will steer the PWM on time.

Current sense CS pin 2 provides a cycle-by-cycle peak current protection for the flyback transformer and flyback MOSFET 16. An external resistor RF is placed between the source of the flyback MOSFET 16 and the power ground for sensing the instantaneous current in the flyback MOSFET 16 during the ON-time. Should the voltage across the sensing resistor RF exceed the internal 1.2V threshold at the CS pin 2 then the PWM pin 1 output will go 'LOW' to turn off the flyback MOSFET 16 and limit the peak current. The PWM pin 1 output will remain 'LOW' until a flyback PWM maximum OFF-time programming TOFF pin 6 times out or a zero-crossing of the flyback MOSFET 16 drain voltage is detected. The maximum OFF-time is set by an external capacitor CTOFF, which sets the ramp time at TOFF pin 6 from 0 to 2V. The maximum OFF-time setting determines a boundary between the critical-continuous and continuous-conduction modes of the flyback control circuit 21.

The flyback PWM pin 1 output can also be switched ON and OFF from VSENSE pin 17 and a maximum flyback output voltage threshold setting OV pin 20 for limiting the maximum output voltage. This voltage threshold is the upper voltage limitation threshold for the boost output voltage as measured at VSENSE pin 17. It is set by an internal current source 42 programmed by a resistor at IC reference current IREF pin 9 together with an external resistor ROV. The OV threshold is primarily used to limit or control the maximum full-bridge voltage (flyback output voltage) during open load conditions or during lamp ignition. An external resistor RIREF at IREF pin 9 together with an internal 2V reference voltage determines an internal accurate reference current which is used at the CT, OV and OC pins.

Should the voltage at VSENSE pin 17, which is a measurement of the output voltage across the full-bridge/lamp 22, exceed the voltage at OV pin 20, the PWM pin 1 output will go 'LOW' and the flyback converter will turn OFF. The PWM pin 1 output will turn ON again after TOFF pin 6 has timed out, or, a negative-going transition is detected on flyback quasi-resonant voltage zero-crossing detection input ZX pin 5, as described above. When the output voltage decreases again below the OV threshold minus a small amount of hysterisis, the flyback converter will operate under the control of the signal at PWM pin 1.

The voltage from the flyback MOSFET 16 drain provides a signal for detecting when the flyback drain voltage has reached zero during the OFF-time of each switching cycle at gate driver output PWM pin 1. A negative-going signal at ZX pin 5 below 1.7V (2V-300 mV hysterisis), signals the end of the OFF-time and the start of the next ON-time at gate driver output PWM pin 1.

Full-Bridge Control

The full bridge stage 22 at the output preferably oscillates at a frequency of around 500 Hz, except immediately after ignition, where it will remain in each polarity for an extended period to reduce the possibility of the lamp extinguishing. The purpose of this is simply to extend lamp life by preventing migration causing deposits to form on the electrodes of the lamp. The full bridge has no effect on the power control.

The VCC supply to the IC 23 may be obtained through a resistor RAUX connected to the VBUS, which will typically remain at 80 to 100V during normal running, allowing a resistor to supply the IC 23 without dissipating excessive power. The IC can also obtain its initial starting voltage directly from the DC input of the ballast and may also draw power from there at the initial point of ignition when the DC bus voltage is very low.

The full-bridge 22 is controlled with CT, LO1, VS1, HO1, VB1, LO2, VS2 and VB2 pins of the internal circuit 27. An external capacitor CT at a full-bridge oscillation frequency setting CT pin 10 programs the switching frequency of the full-bridge. Sink and source currents at CT pin 10 ramp CT voltage up and down between internal 2V and 5V thresholds. As the voltage at this pin ramps up, full-bridge sink/source gate driver outputs at a low-side gate driver LO1 pin 25 and a high-side gate driver HO2 pin 23 are 'ON' and at a low-side gate driver LO2 pin 21 and high-side gate driver HO1 pin 27 are 'OFF'. When the voltage ramps down, outputs at LO2 pin 21 and HO1 pin 27 are 'ON' and outputs at LO1 pin 25 and HO2 pin 23 are 'OFF'. The full-bridge continues to oscillate in this manner with a 50% duty cycle and fixed internal dead-times of e.g., 1.2 us.

The internal full-bridge logic 29, the low-side drivers 32, 33, the 600V high-side drivers 34, 35, and the bootstrap MOSFETs 36, 37 are then responsible for turning full-bridge 22 ON and OFF. The driver logic 29 ensures that when the output at LO1 pin 25 and a switch MLO1 are ON, then the output at HO2 pin 23 and a switch MHO2 are also ON. Inversely, the driver logic 23 also ensures that when the output at LO2 pin 21 and a switch MLO2 are ON, then the output at HO1 pin 27 and a switch MHO1 are also ON. By switching the full-bridge 29 in this manner, an AC symmetrical square-wave voltage is maintained across the lamp.

The internal bootstrap MOSFETs 36, 37, respectively, are turned on to provide supply current to a full-bridge high-side driver supply voltage input VB1 pin 28 during the time when LO1 pin 25 is set 'HIGH', and to a full-bridge high-side driver supply voltage input VB2 pin 24 when LO2 pin 21 is set 'HIGH'. This maintains the supply voltage of the high-side drivers without the need for external high-voltage bootstrap diodes. Both VB1 pin 28 and VB2 pin 24 are supplied internally from IC supply voltage input VCC pin 3 through an integrated bootstrap MOSFET. Additionally, full-bridge high-side driver supply return from switches MHS1 and MHS2 is received at VS1 pin 26 and VS2 pin 22 respectively.

Lamp Power Control

Ignition

The advantage of using the flyback topology over, for example, the boost topology, lies in that if the turns ratio of transformer 66 is a step up of 1 to 4 and the maximum bus voltage required at ignition is 400V, then a 100V MOSFET device may be used. In the shown flyback configuration, the MOSFET 16 has a very low RDSon since a maximum voltage drain to source (VDS) rating of 100V is acceptable.

Initially, the circuit is in an ignition mode, where there is no load at the lamp. The DC bus voltage rises rapidly to 400V when the flyback converter 21 begins to oscillate.

In ignition mode, the voltage at the DC bus becomes high enough to activate the ignition unit 60, which produces a sufficiently high voltage across the lamp to cause ignition. The ignition unit 60 also requires a large negative voltage ZH. This large negative voltage ZH is produced in this ballast by means of a cascade circuit 62. The cascade circuit includes an arrangement of diodes DC, DC2 and DC3 and capacitors CC1, CC2 connected to an AC side of the flyback inductor 66 secondary winding. A high voltage but very little current are required. The cascade circuit connects to the ignition unit 60 through several high value resistors R1, R2, R3, and R4.

When this high voltage ZH occurs, an arc develops in the lamp and a high current immediately flows in the lamp, causing the DC bus to experience a large load. The large load pulls the voltage down to a low level. At this point the lamp may extinguish or continue to operate, thus entering a warm up phase. If the lamp extinguishes at this stage, the flyback converter will raise the DC bus voltage again to 400V, enabling the ignition unit to attempt to start the lamp again. After a number of unsuccessful attempts at ignition the IC 23 will time out and go into a fault mode disabling the flyback converter. At this point it is assumed that the lamp is unable to operate or no lamp is connected.

If the lamp successfully ignites then the current will be high and the voltage will be very low. The DC bus voltage will never rise sufficiently for the cascade circuit to produce a large enough negative voltage to activate the ignition unit to try to operate when the lamp is lit and therefore no special circuitry is required to disable the ignition unit after ignition.

During this initial stage, the maximum current is limited, causing the flyback converter 21 to operate as a constant current source supplying the lamp until the voltage across the lamp begins to increase. This will typically happen after a few seconds as the arc temperature rises within the lamp. As the voltage rises the lamp current will fall and the internal multiplier 39 will govern the lamp power. The internal multiplier 39 applies analog multiplication to the feedback voltages provided through VSENSE pin 17 and ISENSE pin 18 to calculate the lamp power. The gain of the multiplier may be programmed with the external RMULT resistor at MULT pin 16. The multiplier output may be monitored at POUT pin 15, which is connected to COM through an external resistor RPOUT. A scalable output voltage proportional to the lamp power determined by the multiplier is thus provided.

The multiplier 39 output is compared with an internal reference voltage and an error voltage is produced at PCOMP pin 8 by OTA1. Similarly ICOMP pin 7 produces an error voltage when the feedback voltage from ISENSE pin 18 is directly compared to the over-current threshold voltage at OC pin 19. When the lamp current drops from the maximum, the power control loop 38 takes over, using the multiplier to control the lamp power. The error voltages determine the ON time of the flyback converter 21 and thus control the amount of energy transferred to the output and the lamp power.

Regular Operation/Warm Up Phase

During the warm up phase the power reference to the power control loop provided to OTA1 is set in a number of timed stages. Initially the power is programmed much higher than the nominal power and this is reduced in several steps through the warm-up phase to finally reach the nominal lamp power. A capacity PCLK at PCLK pin 13 sets a clock that is divided to provide timing for each of the power level steps within the warm up period. This is known as the warm up profile. The warm up profile can be enabled by connecting PIN pin 14 to VCC pin 3 but can be disabled if the input voltage at PIN pin 14 remains below an internal threshold. In this case it is possible to set the power level by an externally applied DC control voltage from 0 to 5V at pin PIN, when switch 50 is in position "0." The value of the resistor RMULT will set the gain and thus the maximum power.

The purpose of the warm up profile is to provide a high light output from the lamp immediately after ignition. Since if the lamp is driven at nominal power, the light output would be initially very low, it is necessary to overdrive the lamp at first in order to guarantee sufficient light output immediately and also to bring the lamp from its cold state to it nominal operating temperature as rapidly as possible. This is particularly important in automotive applications. Ultimately the lamp power will be maintained at its nominal level through the power control loop for the rest of the period until the ballast is switched off or shut down through detection of a fault.

Hot Restrike

This HID ballast design must also be capable of providing a hot restrike, for example, when the lights are turned off but are still hot and it is desired to turn them on again. HID lamps require a higher energy discharge to restrike when hot. The ignition unit 60 can produce the very high voltage required to ignite the lamp, however the arc has a tendency to extinguish immediately afterwards. Therefore, it is essential to provide the hot restrike, or the correct amount of energy discharged from the DC bus into the lamp after ignition to prevent this problem from occurring.

The present invention achieves the hot restrike by providing a two-stage discharge through CBUS1 and CBUS2. During the ignition mode, CBUS1 will charge to 400V and CBUS2 will charge to 250V through DZB and R9. After ignition, CBUS1 will discharge into the lamp until the DC bus voltage drops below 250V, at which time CBUS2 will also discharge into the lamp. CBUS1 is substantially smaller than CBUS2 because the main cause of the lamp extinguishing during the hot restrike is excessive energy discharge when the arc is produced. Too little energy discharge is also a problem when the voltage drops to a lower level and therefore, CBUS2 is required to provide additional energy at that point.

The lamp voltage is determined by the lamp itself, so only current is available to control lamp power. The value of the capacitor CPCOMP at PCOMP pin 8 determines the loop speed of the power control loop 25. The power control loop 25 allows the lamp power to be controlled at different phases of the lamp operation. In particular, during a warm-up period of the lamp, it is desirable to over-drive the lamp so that the brightness remains constant to the automobile driver. When the lamp is warm, the power can then be maintained at a constant power for providing a constant lumen output from the headlights. Both of these functions, a warm-up profile and constant power control, are obtained with the internal multiplier 39 and the power control loop 35.

Ignition and Warm-up Counters

The control IC 23 includes counters for determining ignition time and the warm-up profile time. The ignition clock frequency for an ignition counter is set or programmed by an external capacitor FLTCLC at ICLK pin 11, and an internal ignition timer determines the ignition time. ICLK pin 11 and its corresponding capacitor FLTCLK allow programming of the amount of time that the HID ballast will remain in ignition mode before going to Fault Mode if the lamp does not ignite. Thus, ICLK pin 11 is necessary for turning the HID ballast OFF safely should the lamp fail to ignite after a given number of trials.

Figure 6A:
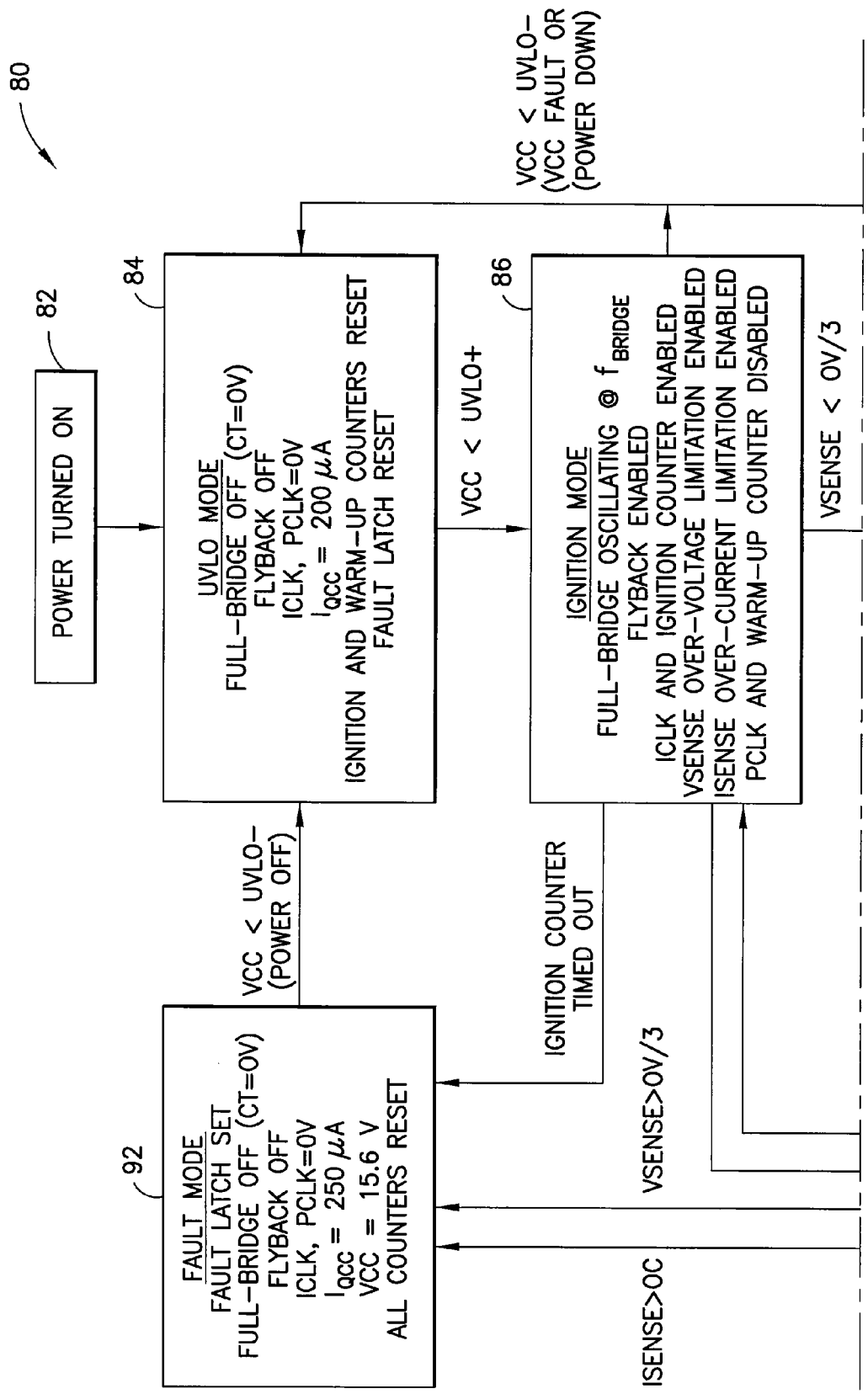
FIG. 6 including 6A-B is a state diagram of the ballast control IC of the invention.

As shown in FIG. 6, when the IC 23 enters an ignition mode at step 86, the ignition clock and counter are enabled and begin to count ICLK. If the lamp ignites successfully, the output voltage measured at VSENSE pin 17 will decrease below OV/3 or the voltage at OV pin 20 divided by three, the ignition timer will be reset and disabled, and the IC 23 will enter warm-up mode step 88. Should VSENSE pin 17 fail to decrease below OV/3 before the ignition timer times out, then the IC 23 will enter Fault Mode at step 92 and the IC will shutdown. In the fault mode, the flyback 21 and full-bridge 22 will become disabled.

Returning to FIGS. 3 and 4, a warm-up counter clock frequency is set or programmed by an external capacitor CPCLK at PCLK pin 13, and an internal ignition timer determines the warm-up time. Multiple outputs from the warm-up counter are connected to the warm-up power profile control block 41 so that the reference power can be increased or decreased at specific time points for satisfying a given profile curve. This profile curve should be set such that the lumen output of the lamp is constant during warm-up. This could have, for example, a linear ramp up profile, an exponential ramp up profile, an RC ramp up profile, etc., and it can be shaped by changing the power reference accordingly at specific time point signals from the warm-up counter. The shape of the curve is fixed internally with the power control block, but the profile can be shortened or lengthened by decreasing or increasing the capacitor CPCLK at PCLK pin 13. The CPCLK capacitor also allows for setting or programming the time that the HID ballast remains in the warm-up mode before going to Constant Power Mode (step 90, FIG. 6).

Fault Protection

The IC 23 provides protection against an open-circuit or a short-circuit at the load and a failure of the lamp to ignite. The open-circuit protection is accomplished using VSENSE pin 17 and OV pin 20. As discussed above, the output voltage is measured at VSENSE pin 17 with an external resistor divider network and the over-voltage threshold is programmed with an external resistor ROV at OV pin 20. Should the voltage at VSENSE pin 17 exceed the OV threshold, the PWM pin 1 output goes 'LOW' disabling the flyback. The output voltage will decrease again and the flyback will restart when the voltage at VSENSE pin 17 falls below the OV threshold by a given amount of hysteresis (200 mV typically). This will keep the output voltage limited to a maximum value while the external ignition circuitry attempts to ignite the lamp.

A current sensing resistor RS is placed between the source of both low side full-bridge MOSFETs MLS1 and MLS2 and the power ground for sensing the total load current. During the short-circuit condition, ISENSE pin 18 voltage will increase above OC pin 19 voltage and the IC 23 will enter a Fault Mode (step 92, FIG. 6) and become disabled. The flyback 21 and the full-bridge 22 will be safely disabled. Finally, should the lamp fail to ignite, VSENSE pin 17 will remain above the OV/3 threshold and the ignition timer will time out. This will cause the IC 23 to enter Fault Mode (step 92, FIG. 6) and safely shutdown.

Interfacing to External MCU

Turning now to FIG. 5, the micro controller 50 is able to control the power reference directly and bypass the preset warm up profiles inside the HID control IC. The micro controller produces a PWM output, which is converted to a DC through a simple filter. The filter is formed from a resistor RPIN and a capacitor CPIN connected to PIN pin 14. This allows the micro controller 50 to directly control the lamp power, which can be programmed as required.

In the shown configuration, the multiplier 39 output POUT pin 15 is monitored by the microcontroller through an internal analog to digital converter, allowing it to make adjustments to the PIN control voltage where necessary to maintain the required operation. The clock signals required for the fault counters and the full bridge oscillator are also provided by the micro controller rather than from external capacitors.

It would also be possible to directly monitor the lamp voltage and lamp current through the A to D converter of the micro controller and even to carry out the multiplication digitally rather than utilize the analog multiplier inside the HID control IC 23, however this should not be necessary.

By having a micro controller in the system it is also possible to add communication features allowing the HID ballast to send messages back to a management system within the vehicle, for example to indicate when a lamp has failed or is nearing end of life and should be replaced. A 5V supply to the microcontroller 50 is easily provided through a linear regulator connected to the VCC supply of the ballast control IC 23.

As shown in FIG. 5, the IC 23 can be interfaced with an external micro controller unit (MCU) 50. The IC 23 includes a reference for the lamp power control PIN pin 14 set by an external voltage from 0 to 5VDC analog power control input. This allows for an external input, i.e., from an external MCU 50, to program the lamp power for warm-up and/or constant power mode. This can be necessary when programming the HID ballast for different lamp types that may require different warm-up/constant power settings. Setting the voltage at PIN pin 14 above 5.1V will program the IC 23 to the internally fixed warm-up and constant power settings. Thus a low-end ballast can use the single IC approach with the internally fixed warm-up profile, and a high-end ballast can contain an MCU 50 for more flexibility during manufacturing.

The IC 23 further includes an output power pin, POUT pin 15. An external resistor RPOUT at POUT pin 15 produces voltage that is used for monitoring the lamp power with the MCU 50. The MCU 50 can therefore set PIN pin 14 according to different lamp types and warm-up profiles and directly monitor the output power by monitoring POUT pin 15 to make sure the actual output power matches the programmed reference.

For example, HG pin 12 allows, the MCU 50 to set mercury-free lamp profile. Without the MCU 50, connecting HG pin 12 to VCC pin 3 will set the warm-up power control to the correct warm-up profile for mercury-free HID lamps. Connecting this pin to IC ground return COM pin 4 will set the warm-up power control to the correct warm-up profile for mercury-based HID lamps.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. An electronic for driving a high intensity discharge (HID) lamp, the electronic ballast comprising:
    a voltage boost stage for receiving a DC input voltage and outputting a boosted DC output voltage with a controlled current;
    a switching stage for converting said boosted DC output voltage to a switched AC voltage which is capable of driving the HID lamp;
    an IC controller coupled to the voltage boost stage and the switching stage for controlling both, wherein the IC controller includes:
    a circuit for setting ON time and OFF time of a PWM signal, the PWM signal increasing or decreasing the boosted DC output voltage current by controlling a controlled switch of the voltage boost stage in accordance with the set ON and OFF times;
    a driver for providing control signals to the switching stage, the switching stage being provided with said boosted DC output voltage and providing AC power to the HID lamp;
    a lamp power control circuit comprising a sensing circuit for sensing an output current from the switching stage and the boosted DC output voltage; and
    a circuit for setting a duty cycle of said PWM signal thereby to control either or both the ON-time or the OFF-time of said controlled switch, said circuit being responsive to said output current and said boosted DC output voltage for controlling the power provided to said lamp.

2. The ballast of claim 1, wherein the IC controller has an ignition mode and a regular operation mode.

3. The ballast of claim 2, further including a hot restrike circuit providing a two stage discharge, wherein during the ignition mode a first capacitor charges to a first voltage and a second capacitor charges to a second voltage and thereafter the first capacitor discharges into the lamp until the DC bus voltage drops below a threshold level, at which time the second capacitor discharges into the lamp.

4. The ballast of claim 1, wherein the lamp power control circuit comprises a current control loop and a power control loop, and wherein if the lamp current is at a preset maximum level, said current control loop controls the lamp power and if the lamp current is below said preset maximum level, said power control loop controls the lamp power.

5. The ballast of claim 4, wherein the current control loop comprises a first amplifier stage receiving said sensed output current and a reference value and providing an error signal to control said PWM signal and thus the lamp power.

6. The ballast of claim 5, wherein the power control loop comprises a multiplier stage receiving said output current and said boosted DC output voltage for generating a signal proportional to the lamp power and further comprises a second amplifier stage receiving said signal proportional to the lamp power and providing an error signal to control said PWM signal and thus the lamp power.

7. The ballast of claim 6, wherein the IC includes a warm-up profile circuit for causing an overdrive of the lamp for providing a high light output immediately after ignition and to bring the lamp from its cold state to it nominal operating temperature.

8. The ballast of claim 7, wherein a warm-up period set by the warming-up profile circuit includes power level steps during which a power reference to the multiplier stage is set in a plurality of timed stages, where initially the power reference is set higher than a nominal lamp power and then is reduced in a plurality of steps during the warm-up period to reach the nominal lamp power.

9. The ballast of claim 1, further comprising a cascade circuit and an ignition unit, wherein during the ignition mode the cascade circuit provides a high voltage to the ignition unit, the high voltage developing an arc in the lamp and causing a current to flow in the lamp to ignite the lamp.

10. The ballast of claim 9, wherein the cascade circuit is not disabled when the lamp is lit.

11. The ballast of claim 1, wherein the ballast and the HID lamp are used in an automobile.

12. The ballast of claim 1, wherein the voltage boost stage comprises a boost converter.

13. The ballast of claim 1, wherein the voltage boost stage comprises a fly-back converter.

14. The ballast of claim 1, wherein the voltage boost stage controlled switch comprises a MOSFET.

15. The ballast of claim 1, wherein the switching stage is a full-bridge.

16. The ballast of claim 15, wherein the switches of the full-bridge are MOSFETs.

17. The ballast of claim 1, further comprising a warm-up mode, a fault protection mode, and a hot restrike mode.

18. The ballast of claim 1, further comprising a controller interface unit, the controller interface unit directly controlling the IC controller and through it the voltage boost stage and the switching stage, the controller interface unit allowing a user to reprogram the IC controller for allowing the ballast to operate with different model lamps.

19. The ballast of claim 18, wherein the IC controller includes default settings for operating the lamp.

20. An integrated circuit (IC) controller for controlling a ballast driving high intensity discharge (HID) lamp, the IC controller comprising:
   a first circuit for controlling a voltage boost stage of the ballast with a PWM for boosting a DC input voltage to a boosted DC output voltage, the IC controller having an ignition mode and a regular operation mode;
   a second circuit for controlling a switching stage of the ballast for providing a switched AC voltage to the lamp by converting said boosted DC output voltage to a switched AC voltage to drive the HID lamp; and
   a lamp power control circuit including a sensing circuit sensing an output current from the switching stage and the boosted DC output voltage.

21. The IC controller of claim 20, further comprising an interface circuit for connecting to an interface controller unit, the interface controller unit directly controlling the IC controller and through it the first circuit, the second circuit, and the lamp power control circuit, the interface controller unit allowing a user to reprogram the IC controller to operate with different model lamps, each lamp model having different operating requirements.

22. The IC controller of claim 21, wherein the IC controller includes default settings for operating the lamp.

23. The IC controller of claim 20, wherein the first circuit setting a duty cycle of said PWM signal to thereby control the ON-time of said controller switch, said circuit being responsive to said output current and said boosted DC output voltage for controlling the power provided to said lamp.

24. The IC controller of claim 20, wherein the lamp power control circuit comprises a current control loop which controls the lamp power if the lamp current is at a maximum level and a power control loop which controls the lamp power if the lamp current is below a maximum level.

25. The IC controller of claim 24, wherein the current control loop comprises a first amplifier stage receiving said sensed output current and a reference value and providing an error signal to control said PWM signal and thus the lamp power and the power control loop comprises a multiplier stage receiving said output and said boosted DC output voltage for generating a signal proportional to the lamp power and further comprises a second amplifier stage receiving said signal proportional to the lamp power and providing an error signal to control said PWM signal and thus the lamp power.

* * * * *